(12) United States Patent
Watanabe

(10) Patent No.: US 11,837,920 B2
(45) Date of Patent: Dec. 5, 2023

(54) ROTOR, MOTOR, COMPRESSOR, AIR CONDITIONER, AND MANUFACTURING METHOD OF ROTOR

(71) Applicant: Mitsubishi Electric Corporation, Tokyo (JP)

(72) Inventor: Takanori Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 378 days.

(21) Appl. No.: 17/279,350

(22) PCT Filed: Nov. 7, 2018

(86) PCT No.: PCT/JP2018/041285
§ 371 (c)(1),
(2) Date: Mar. 24, 2021

(87) PCT Pub. No.: WO2020/095374
PCT Pub. Date: May 14, 2020

(65) Prior Publication Data
US 2021/0408850 A1 Dec. 30, 2021

(51) Int. Cl.
*H02K 1/27* (2022.01)
*H02K 1/28* (2006.01)
(Continued)

(52) U.S. Cl.
CPC .......... *H02K 1/276* (2013.01); *F24F 1/0018* (2013.01); *F24F 1/38* (2013.01); *F25B 31/026* (2013.01);
(Continued)

(58) Field of Classification Search
CPC .......... H02K 1/276; H02K 1/08; H02K 1/28; H02K 15/02; H02K 2213/03; F24F 1/0018; F24F 1/38; F25B 31/026
See application file for complete search history.

(56) References Cited

U.S. PATENT DOCUMENTS 8,896,176 B2 * 11/2014 Ryu .................. H02K 1/276
310/156.09
2012/0256516 A1 10/2012 Matsushita et al.
(Continued)

FOREIGN PATENT DOCUMENTS

CN 102714437 A 10/2012
JP 3 654 806 B 3/2005
(Continued)

OTHER PUBLICATIONS

Extended European Search Report dated Oct. 15, 2021 in connection with counterpart European Patent Application No. 18939193.1.
(Continued)

*Primary Examiner* — Thomas Truong
(74) *Attorney, Agent, or Firm* — POSZ LAW GROUP, PLC

(57) ABSTRACT

A rotor includes a rotor core having magnet insertion holes in a number corresponding to a pole number, and a center hole. The rotor core has first slits and ribs alternately arranged in the circumferential direction along a periphery of the center hole, and second slits on an outer side with respect to the first slits in the radial direction. The first slits and the second slits are both equal in number to half or an integer multiple of the pole number. Each second slit is formed to cover the rib from an outer side in the radial direction. Each first slit has a length A1 in the circumferential direction and a width A2 in the radial direction. Each second slit has a length B1 in the circumferential direction and a width B2 in the radial direction. A1>A2, B1>B2, and A1>B1 are satisfied.

20 Claims, 15 Drawing Sheets

(51) Int. Cl.
  *H02K 15/02* (2006.01)
  *H02K 1/276* (2022.01)
  *F24F 1/0018* (2019.01)
  *F24F 1/38* (2011.01)
  *F25B 31/02* (2006.01)
  *H02K 1/08* (2006.01)

(52) U.S. Cl.
  CPC ............. *H02K 1/08* (2013.01); *H02K 1/28* (2013.01); *H02K 15/02* (2013.01)

(56) References Cited

U.S. PATENT DOCUMENTS

| | | | |
|---|---|---|---|
| 2014/0062252 A1* | 3/2014 | Nagahiro | H02K 1/2766 310/216.048 |
| 2020/0014259 A1 | 1/2020 | Yabe et al. | |

FOREIGN PATENT DOCUMENTS

| | | |
|---|---|---|
| JP | 2006254662 A | 9/2006 |
| JP | 2008-022601 A | 1/2008 |
| JP | 4 823 787 B | 9/2011 |
| WO | 2018/179063 A1 | 10/2018 |

OTHER PUBLICATIONS

Office Action dated Jan. 20, 2022 in connection with counterpart Australian Patent Application No. 2018448343.

Office Action dated Feb. 14, 2022 in connection with counterpart Indian Patent Application No. 202127019746 (and English translation).

International Search Report of the International Searching Authority dated Jan. 29, 2019 for the corresponding international application No. PCT/JP2018/041285(and English translation).

Office Action dated Sep. 23, 2023 in connection with counterpart Chinese Patent Application No. 201880098898.7 (and English translation).

* cited by examiner

ANGLE [°]
INNER DIAMETER DISTRIBUTION OF
ROTOR CORE DURING HEATING

INNER DIAMETER DISTRIBUTION OF ROTOR
CORE AFTER COOLING (WHEN SHAFT IS INSERTED)

INNER DIAMETER DISTRIBUTION OF ROTOR
CORE AFTER COOLING (WHEN SHAFT IS NOT INSERTED)

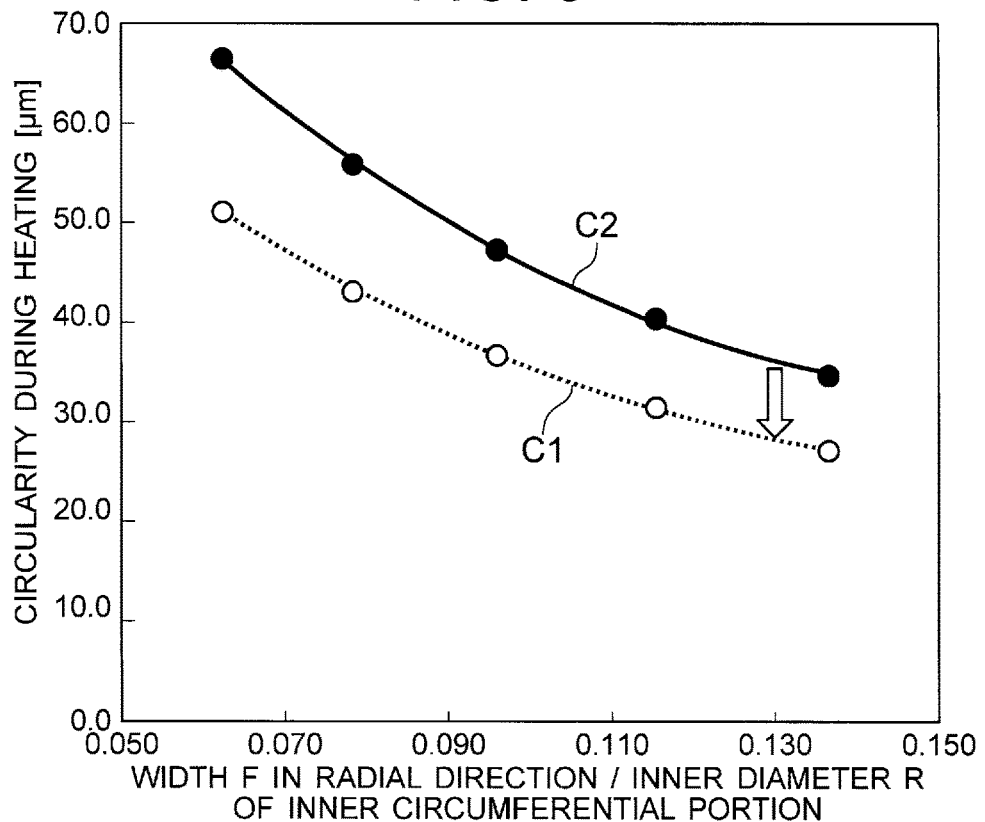
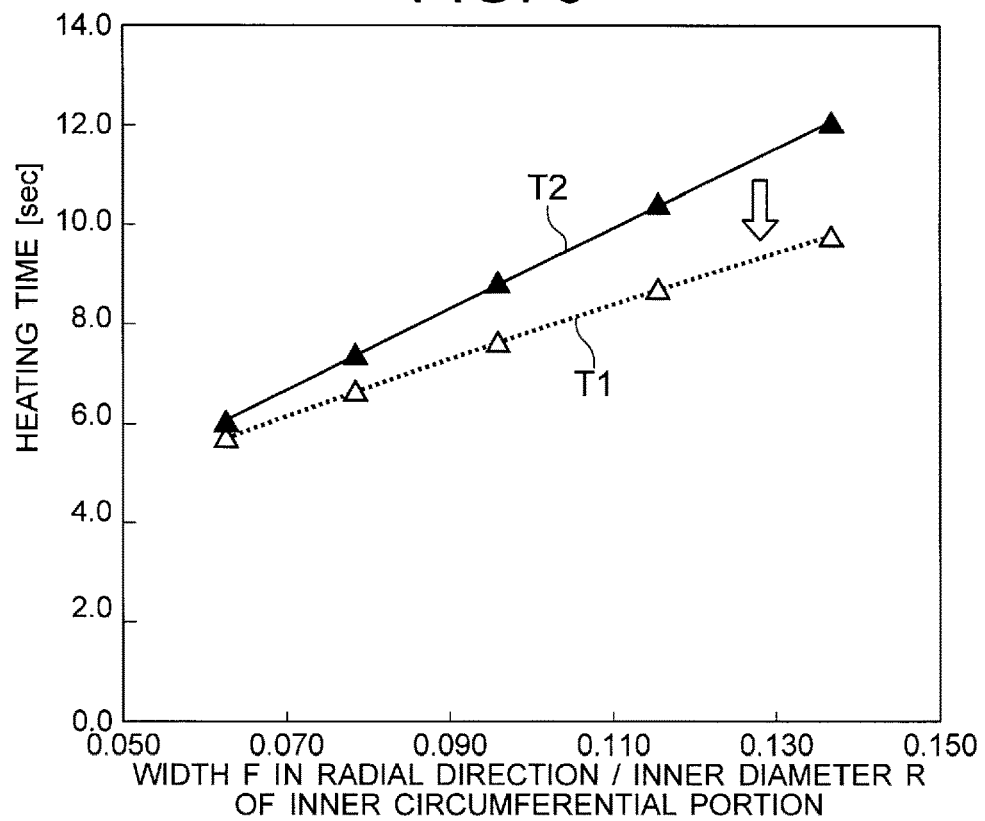

ROTOR, MOTOR, COMPRESSOR, AIR CONDITIONER, AND MANUFACTURING METHOD OF ROTOR

CROSS REFERENCE TO RELATED APPLICATION

This application is a U.S. national stage application of International Patent Application No. PCT/JP2018/041285 filed on Nov. 7, 2018, the disclosure of which is incorporated herein by reference.

TECHNICAL FIELD

The present invention relates to a rotor, a motor, a compressor, an air conditioner, and a manufacturing method of the rotor.

BACKGROUND

In a rotor of a motor, permanent magnets are inserted into magnet insertion holes of a rotor core, and a shaft is fixed to a center hole (that is, a shaft hole) by shrink fitting. In shrink fitting, heat is applied to the center hole of the rotor core. In order to inhibit heating of the permanent magnets in this process, slits are formed around the center hole (see, for example, patent references 1 and 2).

PATENT REFERENCE

Patent Reference 1: Japanese Patent No. 3654806 (see paragraphs 0023 and 0024)
Patent Reference 2: Japanese Patent No. 4823787 (see paragraphs 0018 and 0032)

However, in the case where the slits are formed around the center hole of the rotor core, a difference in how heat is transmitted occurs between portions where the slits are formed and portions where the slits are not formed. This makes the temperature of a periphery of the center hole nonuniform in a circumferential direction. As a result, an inner diameter distortion of the center hole may occur, and a fitting strength between the rotor core and the shaft may decrease.

SUMMARY

The present invention is made to solve the above-described problem, and an object of the present invention is to reduce the inner diameter distortion of the center hole of the rotor core.

A rotor according to the present invention includes a rotor core having magnet insertion holes in a number corresponding to a pole number in a circumferential direction about an axis, and a center hole at a center portion of the rotor core in a radial direction about the axis, and a shaft inserted in the center hole. The rotor core has a plurality of first slits and a plurality of ribs alternately arranged in the circumferential direction along a periphery of the center hole, and has a plurality of second slits on an outer side with respect to the plurality of first slits in the radial direction. The plurality of first slits are equal in number to half or an integer multiple of the pole number, and the plurality of second slits are equal in number to half or an integer multiple of the pole number. Each of the plurality of second slits is formed to cover a corresponding rib of the plurality of ribs from an outer side in the radial direction. Each of the plurality of first slits has a length $A1$ in the circumferential direction and a width $A2$ in the radial direction. Each of the plurality of second slits has a length $B1$ in the circumferential direction and a width $B2$ in the radial direction. $A1>A2$, $B1>B2$, and $A1>B1$ are satisfied.

DETAILED DESCRIPTION

According to the present invention, since the second slits are formed to cover the ribs between the first slits from the outer side in the radial direction, portions (that is, inter-slit portions) between the first slits and the second slits are deformable toward the outer circumferential side of the rotor core. Therefore, portions located on an inner side of the ribs in the radial direction around the center hole are deformable toward the outer circumferential side, and thus an inner diameter distortion of the center hole can be reduced. Furthermore, since the length $A1$ of the first slit in the circumferential direction is longer than the width $A2$ of the first slit in the radial direction, a heat transmission path to the magnet insertion hole can be made longer. Since the length $B1$ of the second slit in the circumferential direction is shorter than the length $A1$ of the first slit in the circumferential direction, through holes or the like can be formed between adjacent second slits, and the heat transmission path to the magnet insertion hole can be made further longer. Thus, heating of the permanent magnets can be inhibited.

BRIEF DESCRIPTION OF THE DRAWINGS

FIG. 8 is a graph representing a relationship between a width of an inner circumferential portion of the rotor core and a circularity of the center hole during heating.
FIG. 9 is a graph representing a relationship between the width of the inner circumferential portion of the rotor core and a heating time.

DETAILED DESCRIPTION

Embodiment 1

(Configuration of Motor 100)

Figure 1:
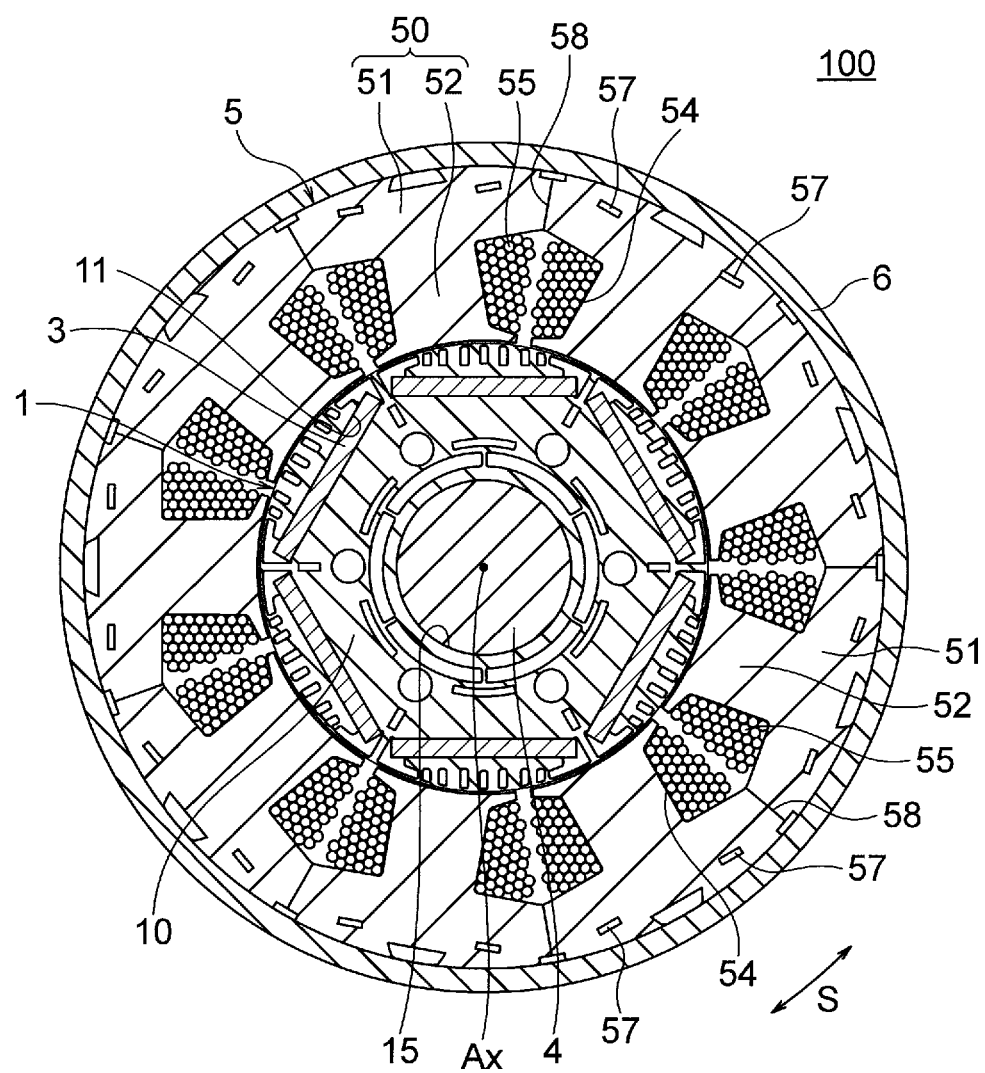
FIG. 1 is a sectional view illustrating a motor according to Embodiment 1.

First, Embodiment 1 of the present invention will be described. FIG. 1 is a sectional view illustrating a motor 100 according to Embodiment 1. The motor 100 is an inner rotor type motor, and includes a cylindrical rotor 1, and an annular stator 5 provided to surround the rotor 1. An air gap of, for example, 0.5 mm is provided between the stator 5 and the rotor 1. The motor 100 is a permanent magnet embedded type motor in which permanent magnets 3 are embedded in the rotor 1.

Hereinafter, an axis of rotation of the rotor 1 is defined as an axis Ax, and a direction of the axis Ax will be referred to as an "axial direction". A direction (indicated by an arrow S in FIG. 1) along a circumference about the axis Ax will be referred to as a "circumferential direction", and a radial direction about the axis Ax will be referred to as a "radial direction". FIG. 1 is a sectional view taken along a plane perpendicular to the axis Ax.

(Configuration of Stator 5)

The stator 5 is provided on an outer side of the rotor 1 in the radial direction so as to surround the rotor 1. The stator 5 includes a stator core 50, and a coil 55 wound on the stator core 50. The stator core 50 is formed by a plurality of electromagnetic steel sheets stacked in the axial direction and fixed together by crimping portions 57 or the like. A thickness of each electromagnetic steel sheet is 0.1 to 0.7 mm.

The stator core 50 includes a yoke 51 extending in the circumferential direction about the axis Ax, and a plurality of teeth 52 extending inward in the radial direction from the yoke 51. The teeth 52 are arranged at equal intervals in the circumferential direction about the axis Ax. An inner end face of each tooth 52 in the radial direction faces an outer circumferential surface of the rotor 1 via the above described air gap. Slots 54 are formed each between adjacent teeth 52, and serve as spaces to accommodate the coil 55. The number of teeth 52 (that is, the number of slots 54) is nine in this example. However, the number of teeth 52 is not limited to nine, and need only be two or more.

The coil 55 is wound around the teeth 52 of the stator core 50 via insulating portions (insulators). The coil 55 is made of a material such as copper or aluminum. The coil 55 may be wound around each tooth 52 (concentrated winding), or may be wound across a plurality of teeth 52 (distributed winding).

(Configuration of Rotor 1)

Figure 2:
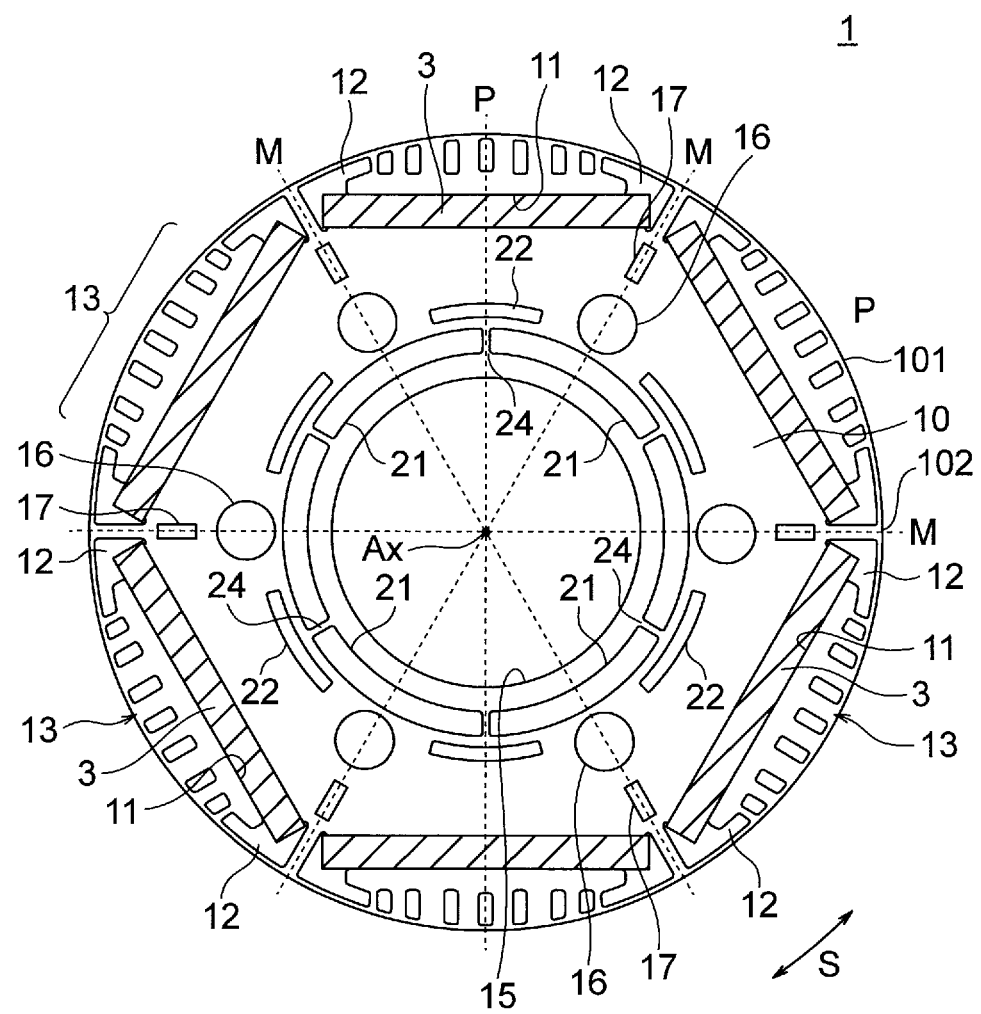
FIG. 2 is a sectional view illustrating a rotor according to Embodiment 1.

FIG. 2 is a sectional view illustrating the rotor 1. The rotor 1 includes a rotor core 10 having a cylindrical shape about the axis Ax. The rotor core 10 is formed by a plurality of electromagnetic steel sheets stacked in the axial direction and fixed together by crimping portions 17 or the like. A thickness of each electromagnetic steel sheet is 0.1 to 0.7 mm.

The rotor core 10 has a center hole 15 formed at its center in the radial direction. The center hole 15 is a through hole extending through the rotor core 10 in the axial direction, and has a cross sectional shape which is circular about the axis Ax. A shaft 4 (FIG. 1) is fixed to the center hole 15 by shrink fitting. The shaft 4 is made of, for example, a metal. The shaft 4 is not illustrated in sectional views of the rotor 1 other than FIG. 1.

A plurality of magnet insertion holes 11 are formed along an outer circumference of the rotor core 10. The plate-like permanent magnets 3 are inserted into the magnet insertion holes 11. In this example, six magnet insertion holes 11 are provided. One permanent magnet 3 is disposed in each magnet insertion hole 11. The permanent magnet 3 has a width in the circumferential direction of the rotor core 10, and a thickness in the radial direction of the rotor core 10. The permanent magnet 3 is formed of, for example, a rare earth magnet containing iron (Fe), neodymium (Nd), and boron (B).

Each permanent magnet 3 disposed in the magnet insertion hole 11 forms a magnetic pole. The number of magnet insertion holes 11 corresponds to the number of poles (pole number) of the rotor 1. In this example, the number of poles is six. However, the number of poles is not limited to six, and need only be two or more.

The center of each magnet insertion hole 11 in the circumferential direction (that is, the center of each permanent magnet 3 in the circumferential direction) forms a pole center P. An interpolar portion M is formed between adjacent magnet insertion holes 11. One permanent magnet 3 is disposed in one magnet insertion hole 11 in this example, but a plurality of permanent magnets 3 may be arranged side by side in the circumferential direction in one magnet insertion hole 11.

Flux barriers (that is, leakage magnetic flux suppression holes) 12 are formed continuously with both ends of each magnet insertion hole 11 in the circumferential direction. The flux barriers 12 suppress leakage magnetic flux between adjacent permanent magnets 3. A core portion between the flux barrier 12 and the outer circumference of the rotor core 10 forms a thin portion for suppressing a shortcircuit of magnetic flux between the adjacent permanent magnets 3. A thickness of the thin portion is desirably equal to the thickness of each electromagnetic steel sheet of the rotor core 10.

A plurality of first slits 21 (that is, inner circumferential-side slits) are formed in the circumferential direction along the center hole 15 of the rotor core 10. The number of first slits 21 is half or an integer multiple of the number of poles (that is, the number of magnet insertion holes 11). In this example, the number of first slits 21 is six, which is equal to (that is, once) the number of poles.

Each first slit 21 extends in an arc shape about the axis Ax. A center of the first slit 21 in the circumferential direction is located at the same position in the circumferential direction as the interpolar portion M. The first slit 21 extends between a position in the circumferential direction corresponding to one pole center P and a position in the circumferential direction corresponding to adjacent pole center P.

A plurality of second slits 22 (that is, outer circumferential-side slits) are formed in the circumferential direction on an outer circumferential side (that is, on an outer side in the radial direction) with respect to the first slits 21. The number of second slits 22 is half or an integer multiple of the number of poles (that is, the number of magnet insertion holes 11). In this example, the number of second slits 22 is six, which is equal to (that is, once) the number of poles.

Each second slit 22 extends in an arc shape about the axis Ax. A center of the second slit 22 in the circumferential direction is located at the same position in the circumferential direction as the pole center P. A length of the second slit 22 in the circumferential direction is shorter than a length of the first slit 21 in the circumferential direction, as will be described later.

When the number of first slits 21 is represented by N, each second slits 22 is formed at a position displaced in the circumferential direction by 360/(2×N) degrees with respect to the first slit 21. When the number of first slits 21 is six, 360/(2×N) is 30 degrees. This angle of displacement is an angle between the center of the second slit 22 in the circumferential direction and the center of the first slit 21 in the circumferential direction.

A plurality of radial-direction slits 13 elongated in the radial direction are formed on an outer circumferential side of each magnet insertion hole 11. In this example, seven radial-direction slits 13 are formed on the outer circumferential side of each magnet insertion hole 11 so as to be symmetrical about the pole center. The radial-direction slits 13 are provided to reduce torque ripples. In this regard, the shape and the number of radial-direction slits 13 are not limited to the examples described herein. It is also possible to employ a configuration in which the rotor core 10 has no radial-direction slit 13.

Figure 3:
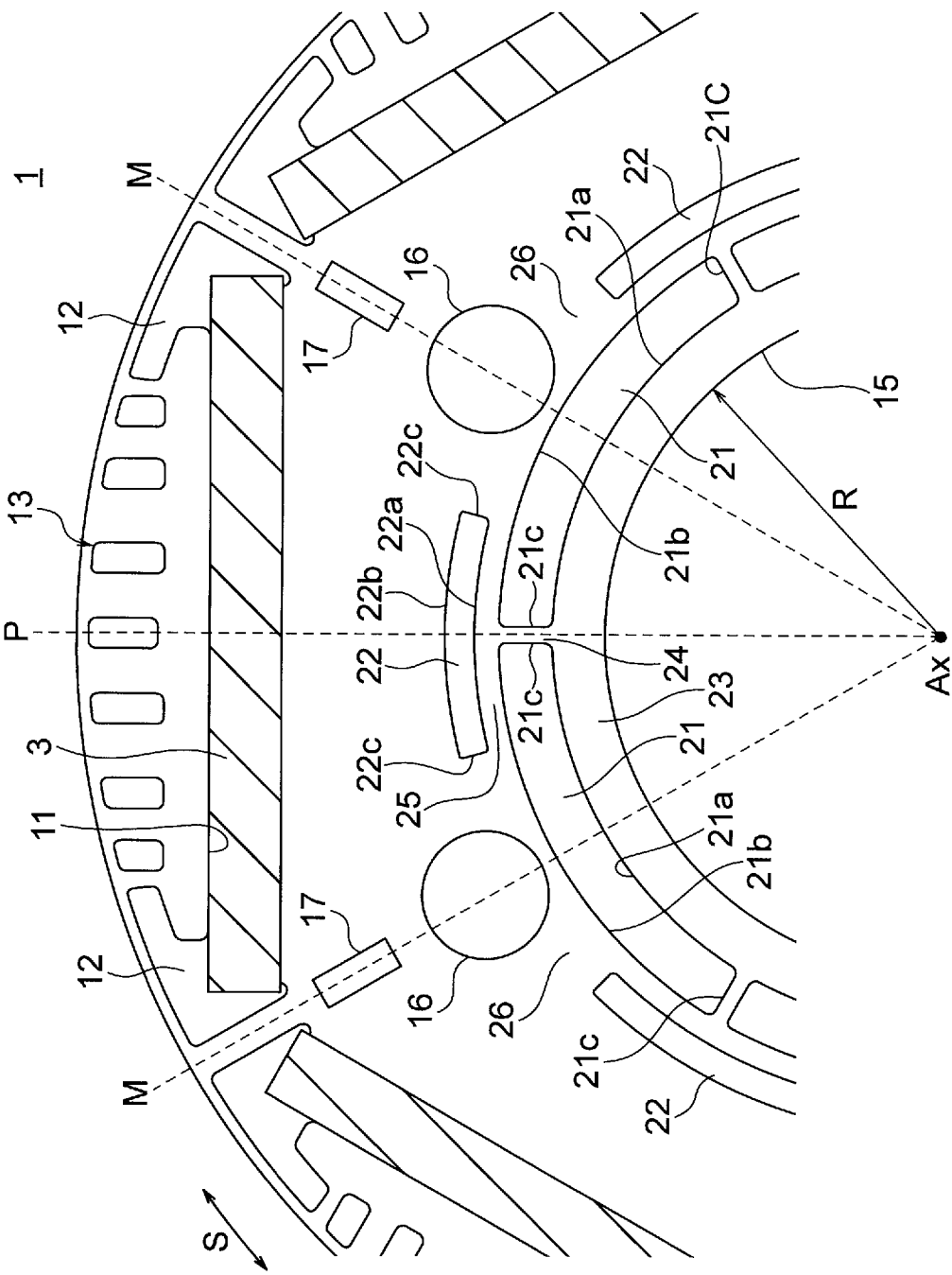
FIG. 3 is an enlarged sectional view illustrating a part of the rotor according to Embodiment 1.

FIG. 3 is an enlarged view illustrating a part of the rotor 1. Each first slit 21 has an inner circumferential edge 21a on an inner side in the radial direction, an outer circumferential edge 21b on an outer side in the radial direction, and end edges 21c on both sides in the circumferential direction. Each of the inner circumferential edge 21a and the outer circumferential edge 21b extends in an arc shape in the circumferential direction. The end edges 21c extend linearly in the radial direction.

Each second slit 22 has an inner circumferential edge 22a on an inner side in the radial direction, an outer circumferential edge 22b on an outer side in the radial direction, and end edges 22c on both sides in the circumferential direction. Each of the inner circumferential edge 22a and the outer circumferential edge 22b extends in an arc shape in the circumferential direction. The end edges 22c extend linearly in the radial direction.

Ribs 24 are formed each between the first slits 21 adjacent to each other in the circumferential direction. Each rib 24 is formed between the end edges 21c of two adjacent first slits 21, and extends in the radial direction. The rib 24 is located at the same position in the circumferential direction as the pole center P. The first slits 21 and the ribs 24 are alternately formed in the circumferential direction around the center hole 15.

An inner circumferential portion 23 extending in the circumferential direction is formed so as to surround the center hole 15. The inner circumferential portion 23 is a portion heated in shrink fitting (described later). The inner circumferential portion 23 includes portions adjacent to the inner circumferential edges 21a of the first slits 21, and portions adjacent to the ribs 24.

Inter-slit portions 25 extending in the circumferential direction are formed each between the first slit 21 and the second slit 22. Each inter-slit portion 25 is formed between the outer circumferential edge 21b of the first slit 21 and the inner circumferential edge 22a of the second slit 22.

Inter-slit regions 26 are formed each between the second slits 22 adjacent to each other in the circumferential direction. Through holes 16 are formed in the inter-slit regions 26. The through holes 16 run through the rotor core 10 in the axial direction. Each through hole 16 has a circular cross section in this example, but may have any cross sectional shape. The through hole 16 is located at the same position in the circumferential direction as the interpolar portion M. The through holes 16 may be used as air holes through which refrigerant of a compressor passes, or rivet holes through which rivets are inserted.

Crimping portions 17 are formed on an outer circumferential side of the through holes 16. The crimping portions 17 are used to integrally fix the electromagnetic steel sheets forming the rotor core 10. Each crimping portion 17 is located at the same position in the circumferential direction as the interpolar portion M. The crimping portion 17 has a rectangular shape in this example, but may have a circular shape.

Figure 4:
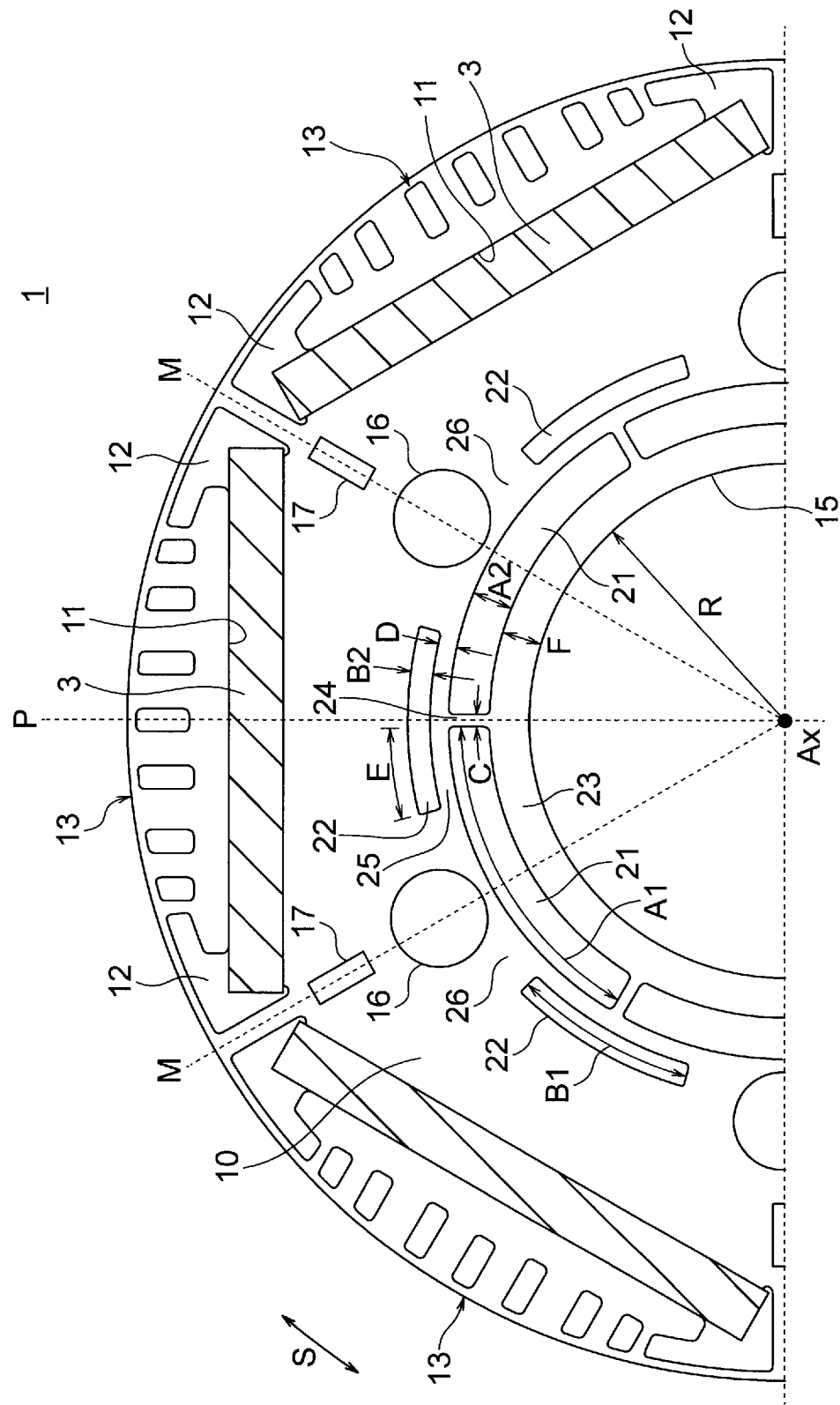
FIG. 4 is an enlarged sectional view illustrating the part of the rotor according to Embodiment 1.

FIG. 4 is a diagram for explaining dimensions of portions of the rotor 1. The first slit 21 has a length A1 in the circumferential direction, and a width A2 in the radial direction. More specifically, the length A1 represents a distance between the two end edges 21c (FIG. 3) of the first slit 21. The width A2 represents a distance between the inner circumferential edge 21a (FIG. 3) and the outer circumferential edge 21b (FIG. 3) of the first slit 21.

The second slit 22 has a length B2 in the circumferential direction, and a width B2 in the radial direction. More specifically, the length B2 represents a distance in the circumferential direction between the two end edges 22c (FIG. 3) of the second slit 22. The width B2 represents a distance in the radial direction between the inner circumferential edge 22a and the outer circumferential edge 22b (FIG. 3) of the second slit 22.

The first slit 21 is formed at a position at a distance F from the center hole 15. The distance F represents a distance from the center hole 15 to the inner circumferential edge 21a (FIG. 3) of the first slit 21. The distance F coincides with the width of the inner circumferential portion 23 in the radial direction. Since the distance F coincides with the width of the inner circumferential portion 23 in the radial direction, the distance F will also be referred to as a width F.

The rib 24 has a width C in the circumferential direction. The width C represents a distance between the end edges 21c (FIG. 3) of two adjacent first slits 21. A length of the rib 24 in the radial direction is equal to the width A2 of the first slit 21 in the radial direction.

The first slit 21 and the second slit 22 are apart from each other in the radial direction by a distance D. The distance D represents a distance between the outer circumferential edge 21b (FIG. 3) of the first slit 21 and the inner circumferential edge 22a (FIG. 3) of the second slit 22. The distance D corresponds to a width of the inter-slit portion 25, and thus the distance D will also be referred to as a width D.

The inter-slit portion 25 has a length E in the circumferential direction. The length E represents a distance in the circumferential direction from the end edge 21c (FIG. 3) of the first slit 21 to the end edge 22c (FIG. 3) of the second slit 22.

(Action)

Figure 5:
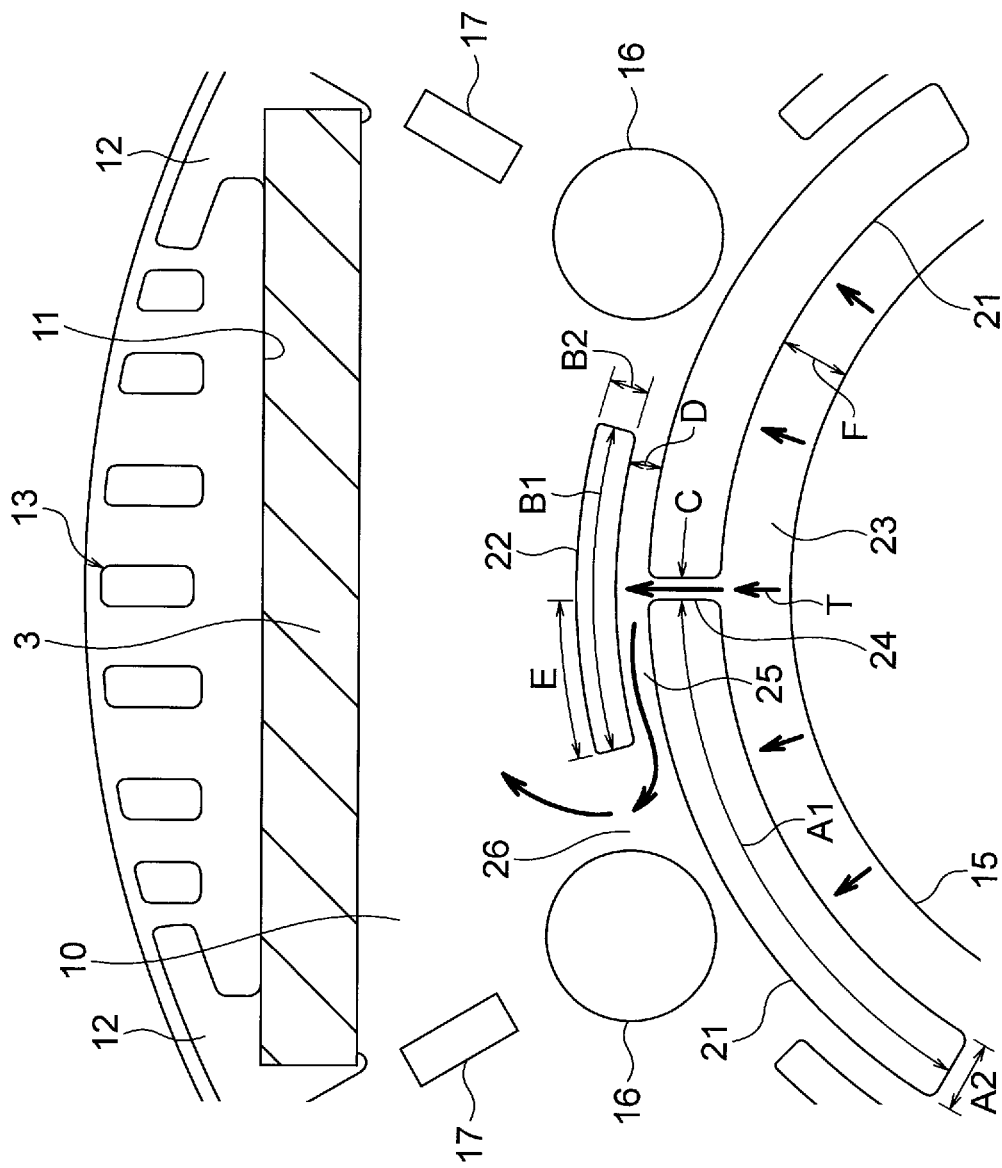
FIG. 5 is a schematic diagram illustrating a heat transmission path in the rotor according to Embodiment 1.

Next, action of the rotor 1 according to Embodiment 1 will be described. FIG. 5 is a schematic diagram illustrating a state in which heat is transmitted in the rotor core 10 in a shrink fitting process. In fixing the shaft 4 to the center hole 15 of the rotor core 10 by shrink fitting, it is necessary to increase an inner diameter of the center hole 15, and thus the rotor core 10 is heated from the center hole 15 side.

Heat applied from the center hole 15 is transmitted from the inner circumferential portion 23 toward the outer circumference of the rotor core 10, and is transmitted to the permanent magnets 3 in the magnet insertion holes 11. When the permanent magnets 3 are heated, demagnetization at a high temperature (that is, thermal demagnetization) may occur, and a magnetic force may decrease. Thus, it is necessary to allow less heat to be transmitted to the magnet insertion holes 11.

As illustrated in FIG. 5, when heat is applied from the center hole 15 of the rotor core 10 as indicated by arrows T, the inner circumferential portion 23 is heated first. All of the first slits 21, the second slits 22, and the through holes 16 are hollow inside and therefore heat is less likely to be transmitted through them.

Thus, heat in the inner circumferential portion 23 is transmitted toward the outer circumferential side through the ribs 24 between the adjacent first slits 21. The heat transmitted through the ribs 24 is further transmitted in the circumferential direction through the inter-slit portions 25 between the first slits 21 and the second slits 22. The heat transmitted through the inter-slit portions 25 travels toward the magnet insertion holes 11 through the inter-slit regions 26 between the adjacent second slits 22.

Since the first slits 21 and the second slits 22 are formed between the center hole 15 and the magnet insertion holes 11 as above, the heat transmission paths from the inner circumferential portion 23 to the magnet insertion holes 11 are made longer. As a result, less heat is transmitted to the magnet insertion holes 11, and heating of the permanent magnets 3 is thus inhibited.

In the inner circumferential portion 23 of the rotor core 10, the temperature rise in the portions adjacent to the ribs 24 is relatively small, since heat dissipates therefrom to the ribs 24. However, the temperature rise in the portions adjacent to the first slit 21 is large, since there is no place for heat to dissipate. Therefore, the temperature of the inner circumferential portion 23 is nonuniform in the circumferential direction.

When the temperature of the inner circumferential portion 23 is nonuniform in the circumferential direction, portions heated at a higher temperature are deformed more largely toward the outer circumferential side, and an inner diameter distortion of the center hole 15 occurs due to a thermal stress. When the inner diameter distortion causes plastic deformation, a circularity of the center hole 15 after cooling may degrade, and thus the fitting strength between the rotor core 10 and the shaft 4 may decrease.

Meanwhile, if the width F of the inner circumferential portion 23 is increased, the temperature difference in the circumferential direction decreases, and the inner diameter distortion of the center hole 15 can thus be reduced. However, if the width F of the inner circumferential portion 23 is increased, the heating time required for the inner diameter of the center hole 15 to reach a target value increases, and thus the productivity decreases.

Therefore, in Embodiment 1, the second slits 22 are disposed so as to be displaced in the circumferential direction with respect to the first slits 21. In other words, the second slits 22 are disposed to cover the ribs 24 from the outer circumferential side (that is, from the outer side in the radial direction).

With this configuration, the inter-slit portions 25 are deformable toward the outer circumferential side, and thus the portions adjacent to the ribs 24 in the inner circumferential portion 23 are easily deformable toward the outer circumferential side. This makes it possible to relax the thermal stress and reduce the inner diameter distortion of the center hole 15. In other words, the degradation in circularity of the center hole 15 after cooling can be inhibited, and the fitting strength between the rotor core 10 and the shaft 4 (see FIG. 7(A) described later) can be improved.

By the deformation of the inter-slit portions 25, the inner circumferential portion 23 is easily deformable toward the outer circumferential side. Thus, the shaft 4 can easily be inserted into the center hole 15, or the heating time can be shortened. As a result, the productivity can further be improved.

The first slit 21 is elongated in the circumferential direction, and the length A1 in the circumferential direction is accordingly longer than the width A2 in the radial direction (A1>A2). Therefore, the heat transmission path from the center hole 15 to each magnet insertion hole 11 can be made longer, and heating of the permanent magnets 3 can be inhibited.

The length B1 of the second slit 22 in the circumferential direction is shorter than the length A1 of the first slit 21 in the circumferential direction (that is, A1>B1). Therefore, the crimping portion or the through hole 16 serving as an air hole or a rivet hole can be formed between the second slits 22 adjacent to each other in the circumferential direction. Thus, the heat transmission path to each magnet insertion hole 11 can be made further longer, and an effect of inhibiting heating of the permanent magnets 3 can be enhanced.

The width C of the rib 24 is desirably as narrow as possible in order to transmit less heat from the inner circumferential portion 23 to the outer circumferential side. However, a minimum dimension allowing stamping of the electromagnetic steel sheet using a die is equal to the thickness of the electromagnetic steel sheet. Therefore, the width C of the rib 24 is desirably equal to or greater than the thickness of the electromagnetic steel sheet. As the width C of the rib 24 increases, the heat is more likely to be transmitted to the outer circumferential side. Thus, the width C of the rib 24 is desirably equal to or less than twice the thickness of the electromagnetic steel sheet.

The width D of the inter-slit portion 25 (that is, a distance between the slits 21 and 22) is desirably as narrow as possible in order to transmit less heat from the inner circumferential portion to the outer circumferential side, and to make the inner circumferential portion 23 easily deformable toward the outer circumferential side. However, a minimum dimension allowing stamping of the electromagnetic steel sheet using a die is equal to the thickness of the electromagnetic steel sheet. Therefore, the width D of the inter-slit portion 25 is desirably equal to or greater than the thickness of the electromagnetic steel sheet. As the width D of the inter-slit portion 25 increases, heat is more likely to be transmitted to the outer circumferential side, and the inter-slit portion 25 is less likely to be deformed. Thus, the width D of the inter-slit portion 25 is desirably equal to or less than four times the thickness of the electromagnetic steel sheet.

As is obvious from FIG. 5, the length E of the inter-slit portion 25 in the circumferential direction is obtained by subtracting half the width C of the rib 24 in the circumferential direction from half the length B1 of the second slit 22 in the circumferential direction. This can be expressed as $E=(B1-C)/2$.

As the length E of the inter-slit portion 25 in the circumferential direction increases, the inter-slit portion 25 can be easily deformed during heating, and an effect of reducing the inner diameter distortion of the center hole 15 is enhanced. Conversely, as the length E of the inter-slit portion 25 decreases, the stress on the inter-slit portion 25 during deformation increases (see FIG. 11 described later), and thus plastic deformation may occur.

Thus, the length E of the inter-slit portion 25 in the circumferential direction is desirably longer than the length of the rib 24 in the radial direction (that is, the width A2 of the first slit 21 in the radial direction). In other words, E=(B1−C)/2>A2 is desirably satisfied. By increasing the length E of the inter-slit portion 25 as above, less heat is transmitted to the magnet insertion holes 11, and heating of the permanent magnets 3 can be inhibited.

The width F of the inner circumferential portion 23 in the radial direction (that is, the distance from the center hole 15 to the first slit 21) is desirably wider than the width C in the circumferential direction of the rib 24 serving as a heat transmission path, and also wider than the width D in the radial direction of the inter-slit portion 25 serving as another heat transmission path. By making the width F of the inner circumferential portion 23 wider than the widths of these heat transmission paths, the temperature difference in the circumferential direction in the inner circumferential portion 23 can be reduced, and thus the inner diameter distortion of the center hole 15 can be reduced (see FIG. 8 described later). Furthermore, since heat accumulated in the inner circumferential portion 23 increases, heat transmitted to the magnet insertion holes 11 can be reduced.

The width C of the rib 24 in the circumferential direction is desirably narrower than the width D of the inter-slit portion 25 in the radial direction. By narrowing the width C of the rib 24, less heat is transmitted from the inner circumferential portion 23 toward the outer circumferential side. Thus, the temperature difference in the circumferential direction in the inner circumferential portion 23 can be reduced, so that the inner diameter distortion of the center hole 15 can be reduced, and heat transmitted to the magnet insertion holes 11 can be reduced.

The width A2 of the first slit 21 in the radial direction is desirably wider than the width B2 of the second slit 22 in the radial direction. By widening the width A2 of the first slit 21 in the radial direction, the length of the rib 24 in the radial direction is increased, and thus less heat is transmitted from the inner circumferential portion 23 to the outer circumferential side. Thus, the temperature difference in the circumferential direction in the inner circumferential portion 23 can be reduced, so that the inner diameter distortion of the center hole 15 can be reduced, and heat transmitted to the magnet insertion holes 11 can be reduced.

The width F of the inner circumferential portion 23 in the radial direction is desirably narrower than the width A2 of the first slit 21 in the radial direction. By narrowing the width F of the inner circumferential portion 23 in the radial direction, the heating time required for the inner diameter of the center hole 15 to reach a target value (see FIG. 9 described later) decreases. On the other hand, when the width F of the inner circumferential portion 23 in the radial direction is narrowed, the inner diameter distortion of the center hole 15 is likely to occur as described above. However, by widening the width A2 of the first slit 21 in the radial direction, less heat is transmitted from the inner circumferential portion 23 to the outer circumferential side. Therefore, the temperature difference in the circumferential direction in the inner circumferential portion 23 can be reduced, and the inner diameter distortion of the center hole 15 can be reduced.

Figure 6:
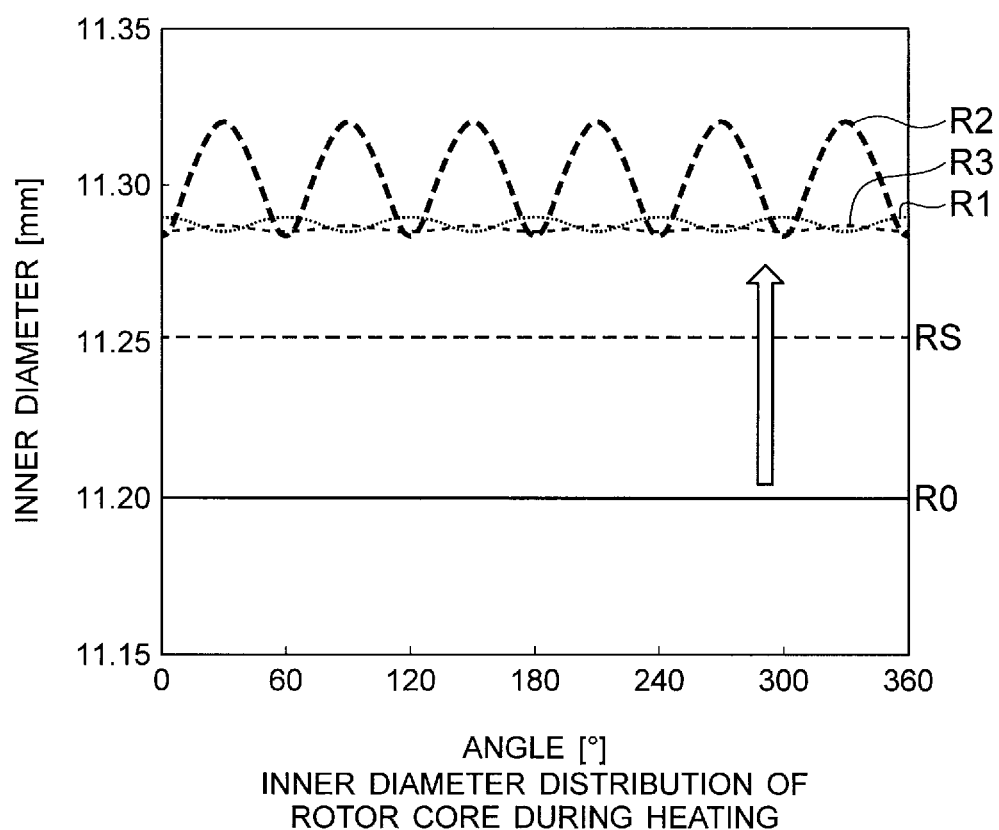
FIG. 6 is a graph representing an example of an inner diameter distribution of a center hole during heating of a rotor core.

Next, an analysis result on the action of the rotor 1 according to Embodiment 1 will be described. FIG. 6 is a diagram representing an inner diameter distribution of the center hole 15 during heating of the rotor core 10. A vertical axis indicates an inner diameter [mm] of the center hole 15, and a horizontal axis indicates an angle [degrees] about the axis Ax. A straight line R0 indicates an inner diameter before heating, which is 11.20 mm in this example. A straight line RS indicates an outer diameter of the shaft 4 inserted into the center hole 15, which is 11.25 mm in this example.

In FIG. 6, a curve R3 indicates an inner diameter distribution when neither the first slits 21 nor the second slits 22 are provided in the rotor core 10. A curve R2 indicates an inner diameter distribution when the first slits 21 are provided in the rotor core 10 but the second slits 22 are not provided in the rotor core 10. A curve R1 indicates an inner diameter distribution when both the first slits 21 and the second slits 22 are provided in the rotor core 10. In each of the curves R1 to R3, a difference between a peak and a valley corresponds to a circularity of the center hole 15.

As the rotor core 10 is heated, the inner diameter of the center hole 15 increases from 11.20 mm to 11.28 mm. When neither the first slits 21 nor the second slits 22 are provided in the rotor core 10, the inner diameter distribution of the center hole 15 is uniform, as indicated by the curve R3.

In contrast, when the first slits 21 are provided in the rotor core 10, the inner diameter distribution of the center hole 15 is nonuniform, as indicated by the curve R2. Peaks of the curve R2 correspond to the centers of the first slits 21 in the circumferential direction (that is, portions in the inner circumferential portion 23 from which heat is least likely to dissipate), and valleys of the curve R2 correspond to the ribs 24 (that is, portions in the inner circumferential portion 23 from which heat is most likely to dissipate).

When both the first slits 21 and the second slits 22 are provided in the rotor core 10, the inner diameter distribution of the center hole 15 is uniform, as indicated by the curve R1. This is because the inter-slit portions 25 between the slits 21 and 22 are deformable toward the outer circumferential side, which makes the portions adjacent to the ribs 24 in the inner circumferential portion 23 easily deformable toward the outer circumferential side, and thus reduces the inner diameter distortion of the center hole 15.

Figure 7A:
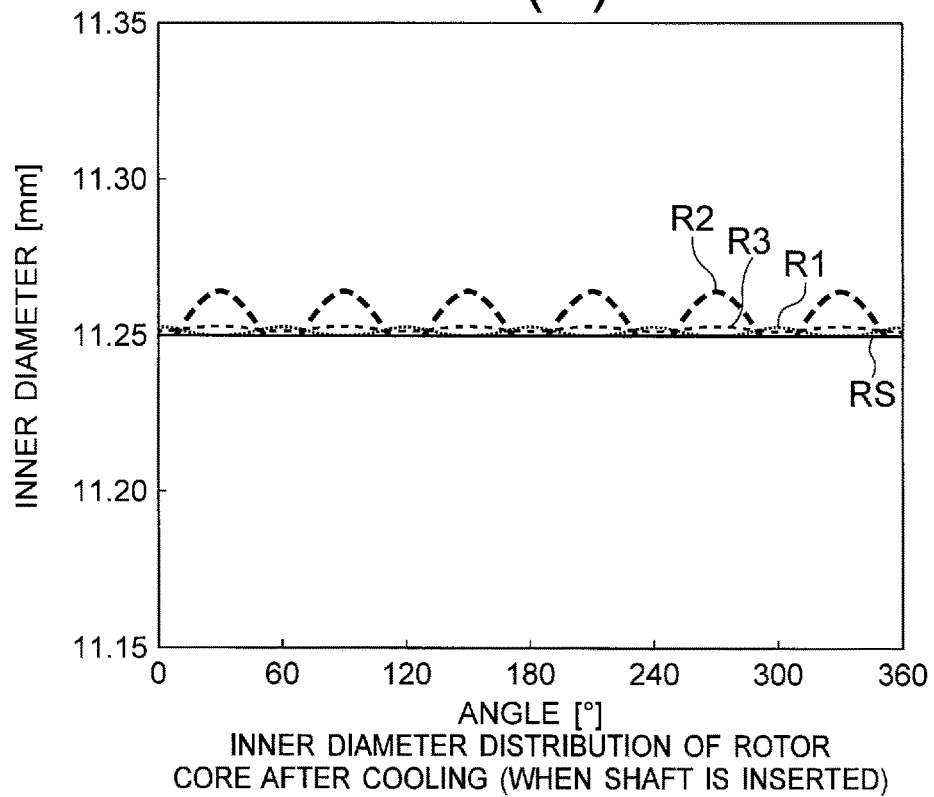
FIG. 7(A) is a graph representing an example of an inner diameter distribution of the center hole after cooling in a state where a shaft is inserted into the rotor core.

FIG. 7(A) is a diagram representing an inner diameter distribution when the rotor core 10 is heated, the shaft 4 is inserted into the center hole 15, and then the rotor core 10 is cooled. A vertical axis indicates an inner diameter [mm] of the center hole 15, and a horizontal axis indicates an angle [degrees] about the axis Ax. A straight line RS and curves R1 to R3 are similar to those in FIG. 6. In each of the curves R1 to R3, a difference between a peak and a valley corresponds to the circularity.

Figure 7B:
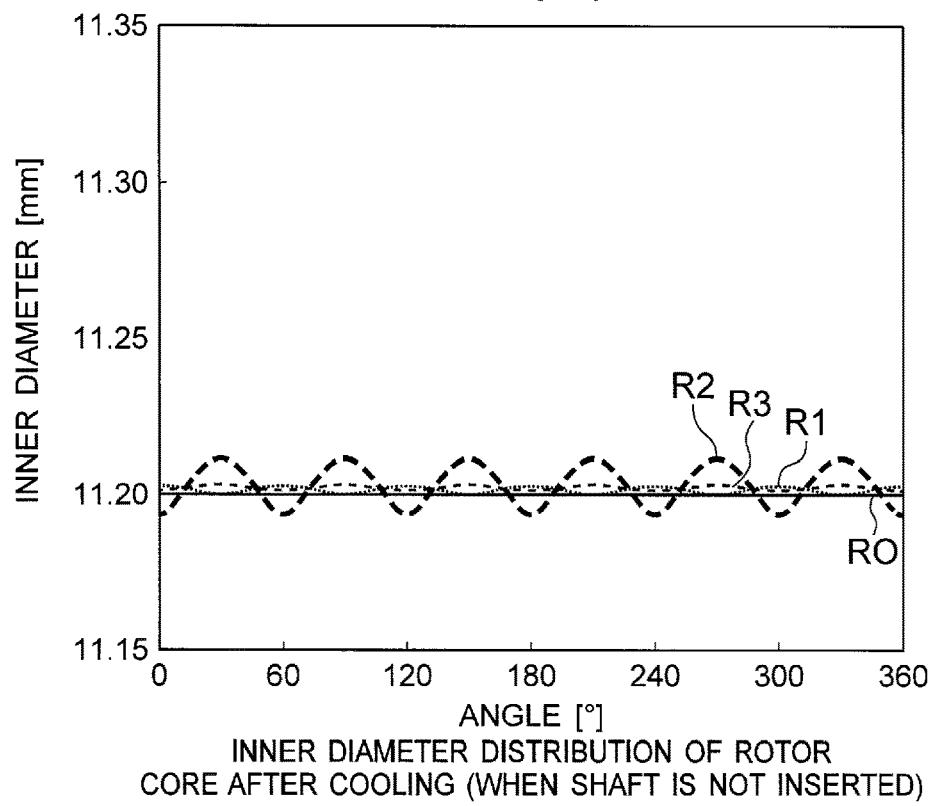
FIG. 7(B) is a graph representing an example of an inner diameter distribution of the center hole after cooling in a state where the shaft is not inserted into the rotor core.

FIG. 7(B) is a diagram representing an inner diameter distribution when the rotor core 10 is heated and cooled without inserting the shaft 4. A vertical axis indicates an inner diameter [mm] of the center hole 15, and a horizontal axis indicates an angle [degrees] about the axis Ax. A straight line R0 and curves R1 to R3 are similar to those in FIG. 6. In each of the curves R1 to R3, a difference between a peak and a valley corresponds to the circularity.

When the inner diameter distortion illustrated in FIG. 6 causes plastic deformation, the inner diameter distortion remains even after the rotor core 10 is cooled, and the circularity of the center hole 15 remains poor, as indicated by the curves R2 in FIGS. 7(A) and 7(B). Therefore, when the shaft 4 is inserted into the center hole 15 in a state where the rotor core 10 is heated, and the rotor core 10 is then cooled, the fitting state between the rotor core 10 and the shaft 4 is insufficient, as indicated by the curve R2 in FIG. 7(A).

In contrast, in Embodiment 1, the inner diameter distortion can be reduced even after the rotor core 10 is cooled, as indicated by the curves R1 in FIGS. 7(A) and 7(B). As a result, the fitting state between the rotor core 10 and the shaft 4 can be made sufficient, as indicated by the curve R1 in FIG. 7(A).

FIG. 8 is a graph representing a relationship between a quotient F/R obtained by dividing the width F of the inner circumferential portion 23 in the radial direction by an inner diameter R of the rotor core 10, and a circularity of the center hole 15 during heating. A curve C1 indicates data when both the first slits 21 and the second slits 22 are provided in the rotor core 10. A curve C2 indicates data when the first slits 21 are provided in the rotor core 10 but the second slits 22 are not provided in the rotor core 10. An allowable range of the circularity of the center hole 15 during heating is 50 μm or less.

From FIG. 8, it is understood that when the inner diameter R of the rotor core 10 is constant, the circularity of the center hole 15 during heating is improved (the value of the circularity decreases) as the width F of the inner circumferential portion 23 in the radial direction increases. This is because as the width F of the inner circumferential portion 23 increases, the temperature difference in the circumferential direction in the inner circumferential portion 23 decreases.

Further, it is understood that the circularity is improved when both the first slits 21 and the second slits 22 are provided in the rotor core 10 (curve C1), as compared with when only the first slits 21 are provided in the rotor core 10 (curve C2). This is because the portions in the inner circumferential portion 23 adjacent to the ribs 24 are easily deformable toward the outer circumferential side by deformation of the inter-slit portions 25 toward the outer circumferential side, and the inner diameter distortion of the center hole 15 is thus reduced.

Further, it is understood that in the case where both the first slits 21 and the second slits 22 are provided in the rotor core 10 (curve C1), the circularity of the center hole 15 during heating falls within 50 μm when F/R is 0.065 or more.

FIG. 9 is a graph representing a relationship between the quotient F/R obtained by dividing the width F of the inner circumferential portion 23 in the radial direction by the inner diameter R of the rotor core 10, and a heating time required for the inner diameter of the center hole 15 to reach a target value. A curve T1 indicates data when both the first slits 21 and the second slits 22 are provided in the rotor core 10. A curve T2 indicates data when the first slits 21 are provided in the rotor core 10 but the second slits 22 are not provided in the rotor core 10.

From FIG. 9, it is understood that when the inner diameter R of the rotor core 10 is constant, the heating time decreases as the width F of the inner circumferential portion 23 in the radial direction decreases. From FIG. 9, it is understood that the heating time is shorter when both the first slits 21 and the second slits 22 are provided in the rotor core 10 (curve T1), as compared with when only the first slits 21 are provided in the rotor core 10 (curve T2).

From the results illustrated in FIGS. 8 and 9, it is understood that providing both the first slits 21 and the second slits 22 in the rotor core 10 makes it possible to improve the circularity of the center hole 15 and to shorten the heating time.

As the width F of the inner circumferential portion 23 in the radial direction increases, the circularity of the center hole 15 is improved as illustrated in FIG. 8. As the width F of the inner circumferential portion 23 decreases, the heating time decreases, as illustrated in FIG. 9. Thus, it is desirable to determine the width F of the inner circumferential portion 23 in the radial direction in consideration of a balance between the circularity and the heating time.

Figure 10:
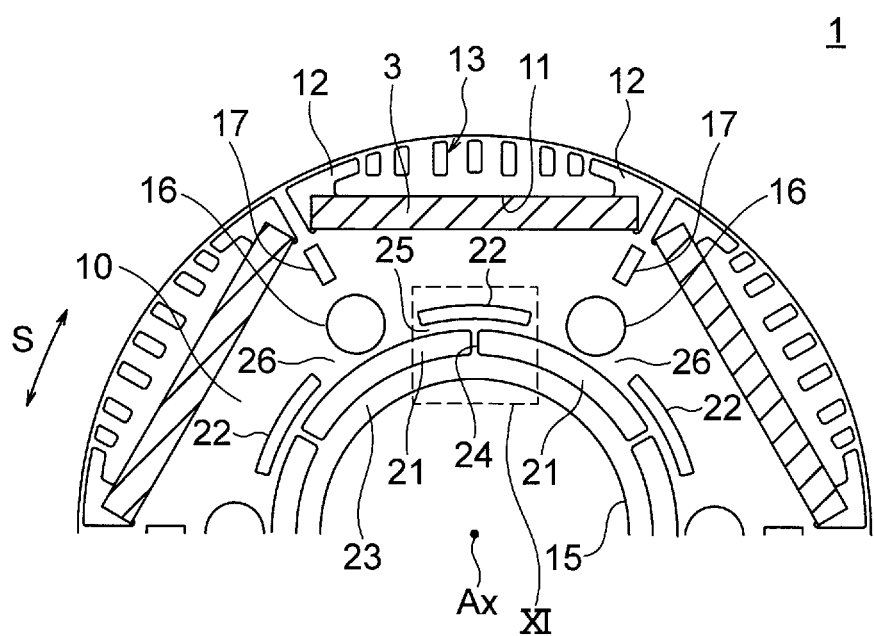
FIG. 10 is a schematic diagram illustrating a part of the rotor according to Embodiment 1.
Figure 11:
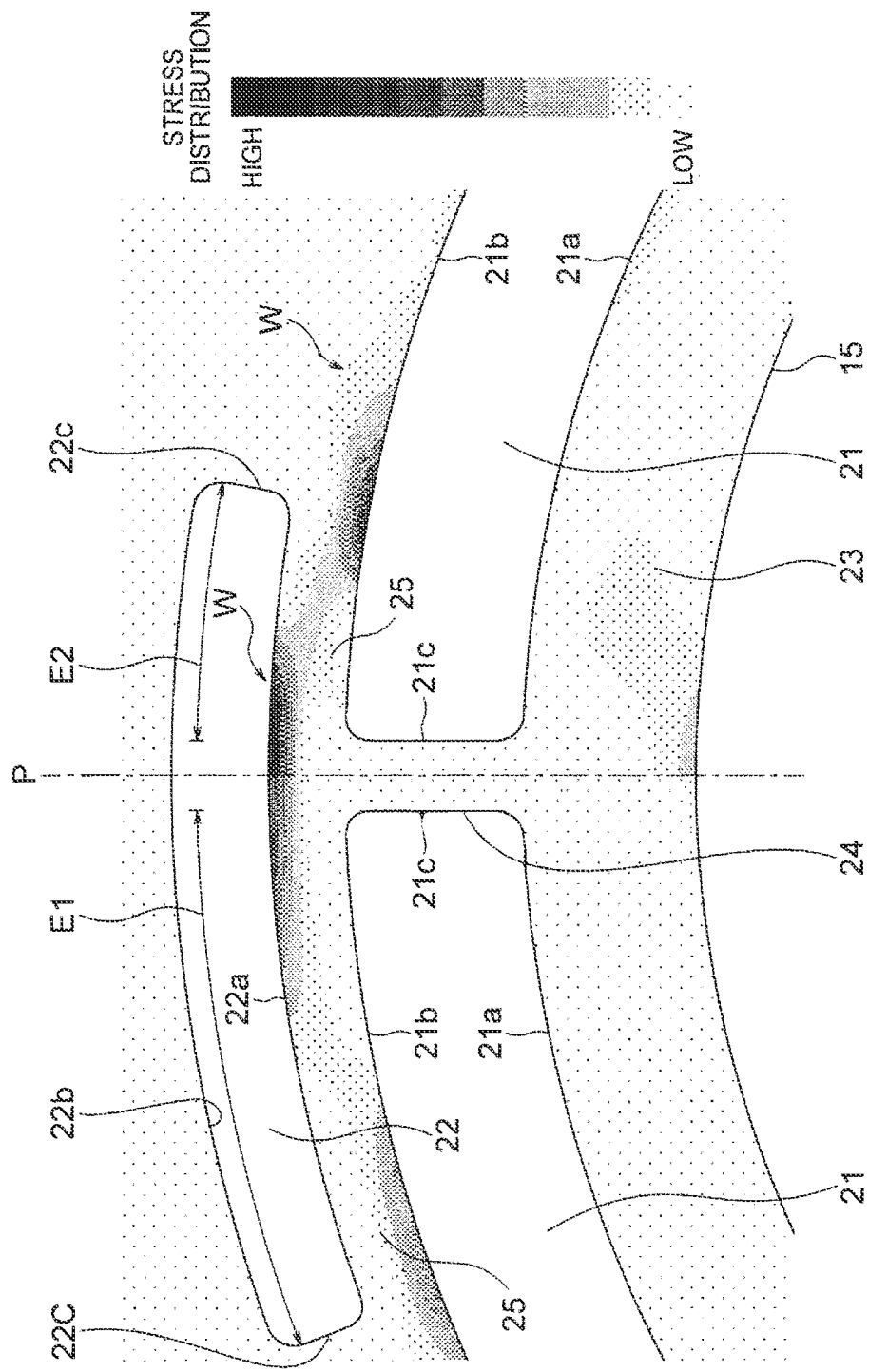
FIG. 11 is a schematic diagram illustrating a stress distribution of a region surrounded by a quadrangle XI in FIG. 10.

FIG. 10 is a schematic diagram illustrating a part of the rotor 1. FIG. 11 is a diagram illustrating an analysis result of a stress distribution of a portion (that is, the inner circumferential portion 23, the rib 24, and the inter-slit portions 25) surrounded by a quadrangle XI in FIG. 10.

For comparison, FIG. 11 illustrates the stress distribution of the inter-slit portions 25 on the left and right sides of the pole center P when these inter-slit portions 25 are assumed to have different lengths. A length E1 of the inter-slit portion 25 on the left side of the pole center P is longer than a length E2 of the inter-slit portion 25 on the right side of the pole center P.

As indicated by arrows W in FIG. 11, in the inter-slit portions 25, portions with high stress are found in a region along the inner circumferential edge 22a of the second slit 22, and regions along the outer circumferential edges 21b of the first slits 21. It is understood that the stress is higher when the length of the inter-slit portion 25 is short (on the right side of the pole center P) than when the length of the inter-slit portion 25 is long (on the left side of the pole center P).

As the stress on the inter-slit portion 25 increases, plastic deformation is more likely to occur. Thus, the length E of the inter-slit portion 25 is desirably made longer.

(Manufacturing Process of Rotor)

Figure 12:
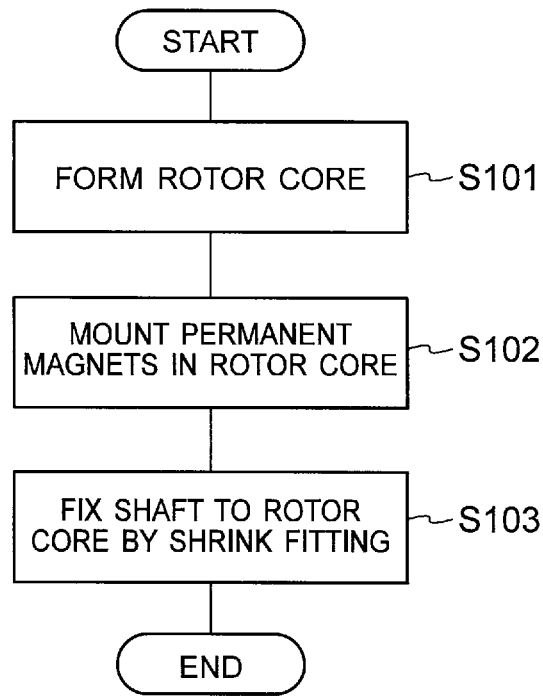
FIG. 12 is a flowchart illustrating a manufacturing process of the rotor according to Embodiment 1.

Next, a manufacturing process of the rotor 1 will be described. FIG. 12 is a flowchart illustrating the manufacturing process of the rotor 1. In the manufacture of the rotor 1, an electromagnetic steel sheet is stamped by a press machine using a die, and a plurality of stamped electromagnetic steel sheets are stacked in the axial direction and integrated together at the crimping portions 17 (FIG. 2) to obtain the rotor core 10 (step S101).

Then, the permanent magnets 3 are inserted into the magnet insertion holes 11 of the rotor core 10 (step S102). The permanent magnets 3 are fixed to the magnet insertion holes 11 by, for example, clearance fitting.

Then, the shaft 4 is fixed to the center hole 15 of the rotor core 10 (step S103) by shrink fitting. In the shrink fitting, the rotor core 10 is heated by, for example, induction heating from the center hole 15 side, so that the inner diameter of the center hole 15 increases by thermal expansion. In a state where the inner diameter of the center hole 15 is increased in this way, the shaft 4 is inserted into the center hole 15.

After the shaft 4 is inserted into the center hole 15, the rotor core 10 is cooled at a room temperature or at a lower temperature. With this operation, the inner diameter of the center hole 15 of the rotor core 10 decreases, and the shaft 4 is thus fitted to the center hole 15. Hence, the rotor core 10 and the shaft 4 are fixed together.

In the shrink fitting process, heat applied from the center hole 15 side of the rotor core 10 is transmitted to the outer circumferential side. However, since the first slits 21 are formed around the center hole 15, and the second slits 22 are formed on the outer circumferential side with respect to the first slits 21, less heat is transmitted to the magnet insertion holes 11, and thus heating of the permanent magnets 3 can be inhibited. Therefore, high-temperature demagnetization of the permanent magnets 3 can be inhibited.

The rare earth magnets constituting the permanent magnets 3 are more prone to demagnetization by heat than other types of permanent magnets (for example, ferrite magnets). Therefore, a configuration in which the first slits 21 and the second slits 22 are provided in the rotor core 10 to transmit less heat to the magnet insertion holes 11 is especially effective in the rotor 1 having the permanent magnets 3 made of the rare earth magnets.

Since the second slits 22 are provided to cover the ribs 24 between the first slits 21 from the outer circumferential side, the inter-slit portions 25 are deformable toward the outer circumferential side, and thus the inner diameter distortion of the center hole 15 can be reduced. This makes it possible to obtain a sufficient fitting state between the shaft 4 and the center hole 15 of the rotor core 10 after cooling.

Effects of Embodiment

As described above, in Embodiment 1, since the second slits 22 are formed to cover the ribs 24 between the adjacent first slits 21 from the outer circumferential side (that is, the outer side in the radial direction), the inter-slit portions 25 can be deformed toward the outer circumferential side of the rotor core 10, and the portions adjacent to the ribs 24 in the inner circumferential portion 23 can be deformed toward the outer circumferential side. Thus, the inner diameter distortion of the center hole 15 can be reduced, and a sufficient fitting state between the rotor core 10 and the shaft 4 can be obtained.

Since the length A1 of the first slit 21 in the circumferential direction is longer than the width A2 of the first slit 21 in the radial direction, the heat transmission path to the magnet insertion hole 11 can be increased and heating of the permanent magnet 3 is inhibited. Furthermore, since the length B1 of the second slit 22 in the circumferential direction is shorter than the length A1 of the first slit 21 in the circumferential direction, the through hole 16 or the like can be formed between the adjacent second slits 22, and the heat transmission path to the magnet insertion hole 11 can be further increased to enhance an effect of inhibiting heating of the permanent magnet 3.

Since the width C of the rib 24 in the circumferential direction is equal to or greater than the thickness of each electromagnetic steel sheet of the rotor core 10 and is equal to or less than twice this thickness, less heat is transmitted from the inner circumferential portion 23 to the outer circumferential side, and thus heating of the permanent magnet 3 can be inhibited.

Since the width D of the inter-slit portion 25 in the radial direction is equal to or greater than the thickness of each electromagnetic steel sheet of the rotor core 10 and is equal to or less than four times this thickness, the heat transmission path to the magnet insertion hole 11 can be increased, and thus heating of the permanent magnet 3 is inhibited. Further, the inter-slit portion 25 is easily deformable toward the outer circumferential side, and thus the inner diameter distortion of the center hole 15 can be reduced.

Since the length B1 of the second slit 22 in the circumferential direction, the width C of the rib 24 in the circumferential direction, and the width A2 of the first slit 21 in the radial direction satisfy (B1−C)/2>A2, the length E of the inter-slit portion 25 can be made longer, so that the inter-slit portion 25 is easily deformable toward the outer circumferential side. Thus, an effect of reducing the inner diameter distortion of the center hole 15 can be enhanced. In addition, the heat transmission path to the magnet insertion hole 11 can be made longer to thereby inhibit heating of the permanent magnet 3.

Since the width F of the inner circumferential portion 23 in the radial direction is wider than the width C of the rib 24 in the circumferential direction and is wider than the width D of the inter-slit portion 25 in the radial direction, the temperature difference in the circumferential direction in the inner circumferential portion 23 can be reduced, and the inner diameter distortion of the center hole 15 can be reduced.

Since the width C of the rib 24 in the circumferential direction is narrower than the width D of the inter-slit portion 25 in the radial direction, less heat is transmitted from the inner circumferential portion 23 to the outer circumferential side. As a result, less heat is transmitted to the magnet insertion hole 11, so that heating of the permanent magnet 3 can be inhibited. Further, the temperature difference in the inner circumferential portion 23 can be reduced, and the inner diameter distortion of the center hole 15 can be reduced.

Since the width A2 of the first slit 21 in the radial direction is wider than the width B2 of the second slit 22 in the radial direction, the length of the rib 24 in the radial direction is made longer, and less heat is transmitted from the inner circumferential portion 23 to the outer circumferential side. As a result, less heat is transmitted to the magnet insertion hole 11, so that heating of the permanent magnet 3 can be inhibited. Further, the temperature difference in the inner circumferential portion 23 can be reduced, so that the inner diameter distortion of the center hole 15 can be reduced.

By making the width F of the inner circumferential portion 23 in the radial direction narrower than the width A2 of the first slit 21 in the radial direction, the heating time required for the inner diameter of the center hole 15 to reach a target value decreases, and less heat is transmitted from the inner circumferential portion 23 to the outer circumferential side. Thus, the temperature difference in the inner circumferential portion 23 can be reduced, and the inner diameter distortion of the center hole 15 can be reduced.

Since the rib 24 is formed at a position corresponding to the pole center P (that is, the center of the magnet insertion hole 11 in the circumferential direction), the heat transmission path to the magnet insertion hole 11 can be made long to thereby inhibit heating of the permanent magnet 3.

Since both the number of first slits 21 and the number of second slits 22 are equal to (that is, once) the number of poles, the weight balance of the rotor 1 in the circumferential direction can be well maintained, and vibration of the motor 100 can be inhibited.

Embodiment 2

Figure 13:
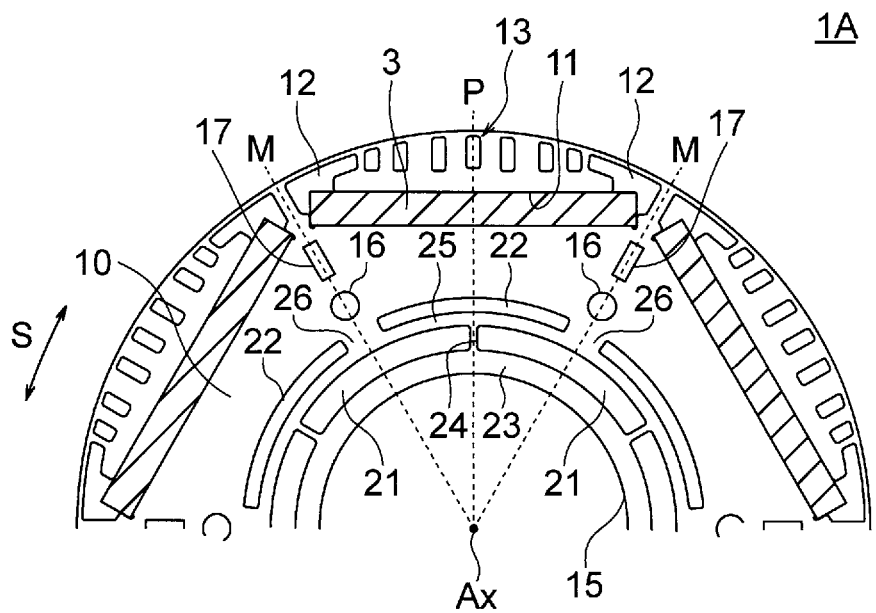
FIG. 13 is a sectional view illustrating a part of a rotor according to Embodiment 2.

Next, Embodiment 2 will be described. FIG. 13 is a sectional view illustrating a rotor 1A according to Embodiment 2. In the rotor 1 according to the above-described Embodiment 1, the through holes 16 are formed in the inter-slit regions 26 between the adjacent second slits 22. In contrast, in the rotor 1A according to Embodiment 2, through holes 16 are formed on an outer circumferential side with respect to the inter-slit regions 26 between the adjacent second slits 22.

More specifically, a length of the second slit 22 in Embodiment 2 in the circumferential direction is shorter than that of the first slit 21, but is longer than that of the second slit 22 in Embodiment 1. Thus, the inter-slit region 26 is narrower than in Embodiment 1. An inner diameter of the through hole 16 is smaller than that of the through hole 16 in Embodiment 1.

Each through hole 16 is disposed on the outer circumferential side (that is, the outer side in the radial direction) of the inter-slit region 26, as described above. Heat transmitted through the rib 24 and the inter-slit portion 25 passes through between the through hole 16 and the second slit 22, and travels toward the magnet insertion hole 11.

In Embodiment 2, the length of the second slit 22 in the circumferential direction can be made longer than that in Embodiment 1, and thus the heat transmission path to the magnet insertion hole 11 can be made longer. Furthermore, deformation of the inter-slit portion 25 toward the outer circumferential side is facilitated, and thus an effect of reducing the inner diameter distortion of the center hole 15 can be enhanced.

The rotor 1A according to Embodiment 2 is configured in the same manner as the rotor 1 according to Embodiment 1, except for the arrangement and sizes of the through holes 16, and the lengths of the second slits 22. In other words, the relationships among the dimensions A1, A2, B1, B2, C, D, E, and F described with reference to FIG. 4 are also satisfied in Embodiment 2.

According to Embodiment 2, since the through holes 16 are formed on the outer circumferential side of the inter-slit regions 26 between the adjacent second slits 22, the lengths of the second slits 22 can be made longer. Therefore, the heat transmission paths to the magnet insertion holes 11 are made longer, and thus an effect of inhibiting heating of the permanent magnets 3 can be enhanced. Further, deformation of the inter-slit portions 25 toward the outer circumferential side is facilitated, and thus an effect of reducing the inner diameter distortion of the center hole 15 can be enhanced.

Embodiment 3

Figure 14:
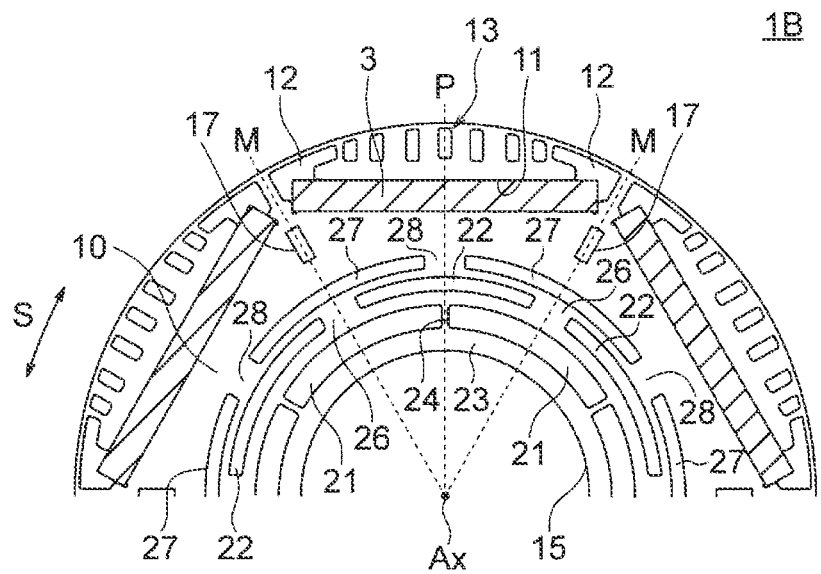
FIG. 14 is a sectional view illustrating a part of a rotor according to Embodiment 3.

Next, Embodiment 3 will be described. FIG. 14 is a sectional view illustrating a rotor 1B according to Embodiment 3. The rotor 1B according to Embodiment 3 further includes third slits 27 on the outer side in the radial direction with respect to the second slits 22 of the rotor 1A according to Embodiment 2.

The third slits 27 in Embodiment 3 are formed to cover, from the outer side in the radial direction, the inter-slit regions 26 between the second slits 22 adjacent to each other in the circumferential direction. The center of the third slit 27 in the circumferential direction is located at the same position in the circumferential direction as the interpolar portion M. Inter-slit regions 28 are formed each between the third slits 27 adjacent to each other in the circumferential direction. Each inter-slit region 28 is located at the same position in the circumferential direction as the pole center P.

In FIG. 14, a length of the third slit 27 in the circumferential direction is equal to a length of the second slit 22 in the circumferential direction, but may be shorter or longer than the length of the second slit 22 in the circumferential direction. In the example illustrated in FIG. 14, no through holes 16 (FIG. 13) are formed, but the through holes 16 may be formed in the inter-slit regions 28.

The rotor 1B according to Embodiment 3 is configured in the same manner as the rotor 1A according to Embodiment 2, except for the presence or absence of the third slits 27 and the through holes 16. In other words, the relationships among the dimensions A1, A2, B1, B2, C, D, E, and F described with reference to FIG. 4 are also satisfied in Embodiment 3.

According to Embodiment 3, since the third slits 27 are provided on the outer circumferential side of the second slits 22, the heat transmission paths to the magnet insertion holes 11 can be made longer, and thus an effect of inhibiting heating of permanent magnets 3 can be enhanced.

Embodiment 4

Figure 15:
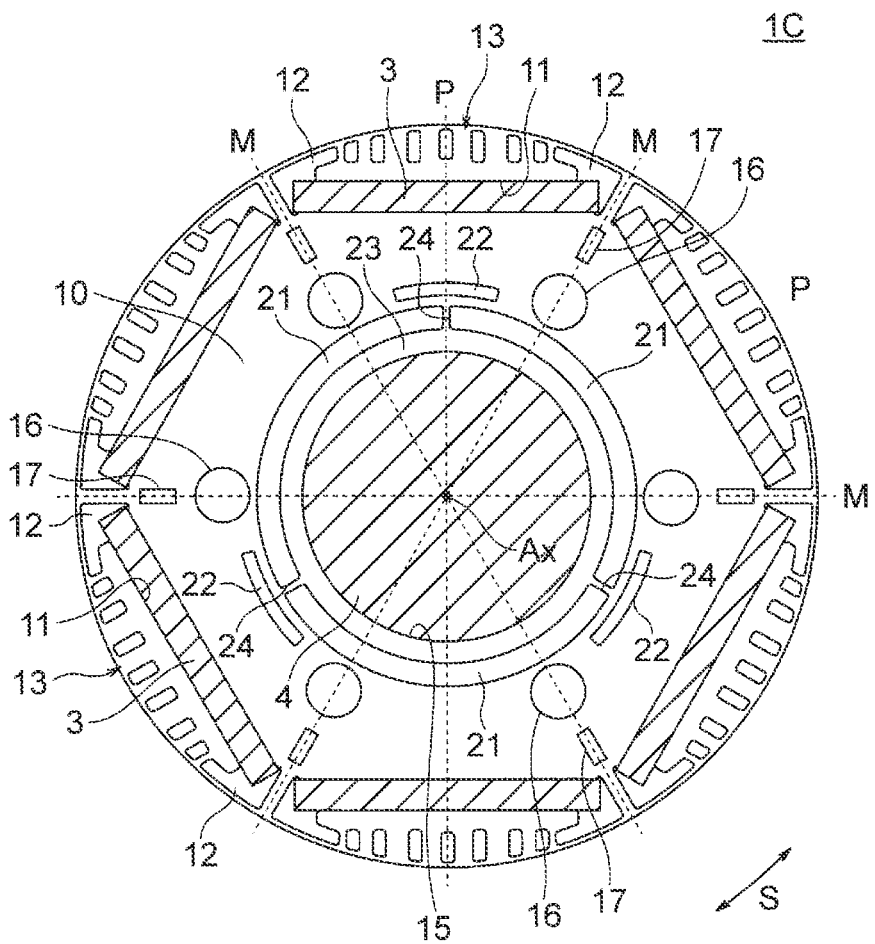
FIG. 15 is a sectional view illustrating a rotor according to Embodiment 4.

Next, Embodiment 4 will be described. FIG. 15 is a sectional view illustrating a rotor 1C according to Embodiment 4. In the above-described Embodiment 1, both the number of first slits 21 and the number of second slits 22 are equal to the number of poles. In contrast, in Embodiment 4, the number of first slits 21 and the number of second slits 22 are half the number of poles. When the number of poles is six, both the number of first slits 21 and the number of second slits 22 are three.

Each first slit 21 in Embodiment 4 extends from a position in the circumferential direction corresponding to the pole center P of one magnet insertion hole 11 to a position in the circumferential direction corresponding to the pole center P of a second adjacent magnet insertion hole 11. Ribs 24 are formed each between the first slits 21 adjacent to each other in the circumferential direction.

Each second slit 22 is formed to cover the rib 24 from the outer circumferential side. When the number of first slits 21 is represented by N, each second slits 22 is formed at a position displaced in the circumferential direction by 360/(2×N) degrees with respect to the first slit 21. In FIG. 15, the number of first slits 21 is three, and thus 360/(2×N) is 60 degrees. The length of the second slit 22 in the circumferential direction is shorter than the length of the first slit 21 in the circumferential direction.

The rotor 1C according to Embodiment 4 is configured in the same manner as the rotor 1 according to Embodiment 1, except for the number of first slits 21 and the number of second slits 22. In other words, the relationships among the dimensions A1, A2, B1, B2, C, D, E, and F described with reference to FIG. 4 are also satisfied in Embodiment 4.

According to Embodiment 4, as in Embodiment 1, the inner diameter distortion of the center hole 15 can be reduced, and heating of the permanent magnets 3 can be inhibited. Furthermore, since both the number of first slits 21 and the number of second slits 22 are half the number of poles, the weight balance of the rotor 1C in the circumferential direction can be well maintained, and vibration of the motor 100 can be inhibited.

Embodiment 5

Figure 16:
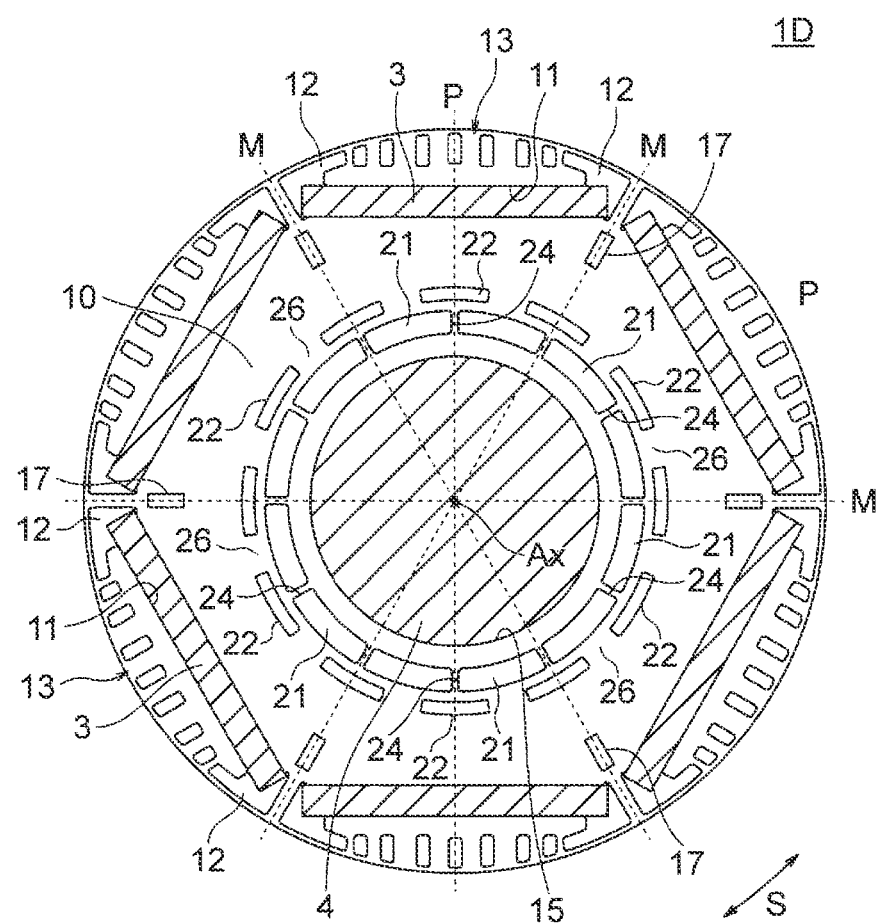
FIG. 16 is a sectional view illustrating a rotor according to Embodiment 5.

Next, Embodiment 5 will be described. FIG. 16 is a sectional view illustrating a rotor 1D according to Embodiment 5. In the above-described Embodiment 1, both the number of first slits 21 and the number of second slits 22 are equal to (that is, once) the number of poles. In contrast, in Embodiment 5, the number of first slits 21 and the number of second slits 22 are twice the number of poles. When the number of poles is six, both the number of first slits 21 and the number of second slits 22 are 12.

Each first slit 21 in Embodiment 5 extends from a position in the circumferential direction corresponding to the pole center P of one magnet insertion hole 11 to a position in the circumferential direction corresponding to an end of the magnet insertion hole 11 in the circumferential direction. Ribs 24 are formed each between the first slits 21 adjacent to each other in the circumferential direction.

Each second slit 22 is formed to cover the rib 24 from the outer circumferential side. When the number of first slits 21 is represented by N, each second slit 22 is formed at a position displaced in the circumferential direction by 360/(2×N) degrees with respect to the first slit 21. In FIG. 16, the number of first slits 21 is 12, and thus 360/(2×N) is 15 degrees. The length of the second slit 22 in the circumferential direction is shorter than the length of the first slit 21 in the circumferential direction.

In the example illustrated in FIG. 16, no through holes 16 (FIG. 2) are formed, but the through holes 16 may be formed in inter-slit regions 26 between adjacent second slits 22, or on the outer circumferential side of the inter-slit regions 26.

The rotor 1D according to Embodiment 5 is configured in the same manner as the rotor 1 according to Embodiment 1, except for the numbers of first slits 21 and second slits 22, and the presence or absence of the through holes 16. In other words, the relationships among the dimensions A1, A2, B1, B2, C, D, E, and F described with reference to FIG. 4 are also satisfied in Embodiment 5.

According to Embodiment 5, as in Embodiment 1, the inner diameter distortion of the center hole 15 can be reduced, and heating of the permanent magnets 3 can be inhibited. Furthermore, since both the number of first slits 21 and the number of second slits 22 are twice the number of poles, the weight balance of the rotor 1D in the circumferential direction can be well maintained, and vibration of the motor 100 can be suppressed.

In this example, both the number of first slits 21 and the number of second slits 22 are twice the number of poles, but they are not limited to a number that is twice the number of poles, and need only be an integer multiple of the number of poles.

In the above-described Embodiments 1 to 5, the number of first slits 21 and the number of second slits 22 are equal to each other, but they may be different from each other.

(Rotary Compressor)

Figure 17:
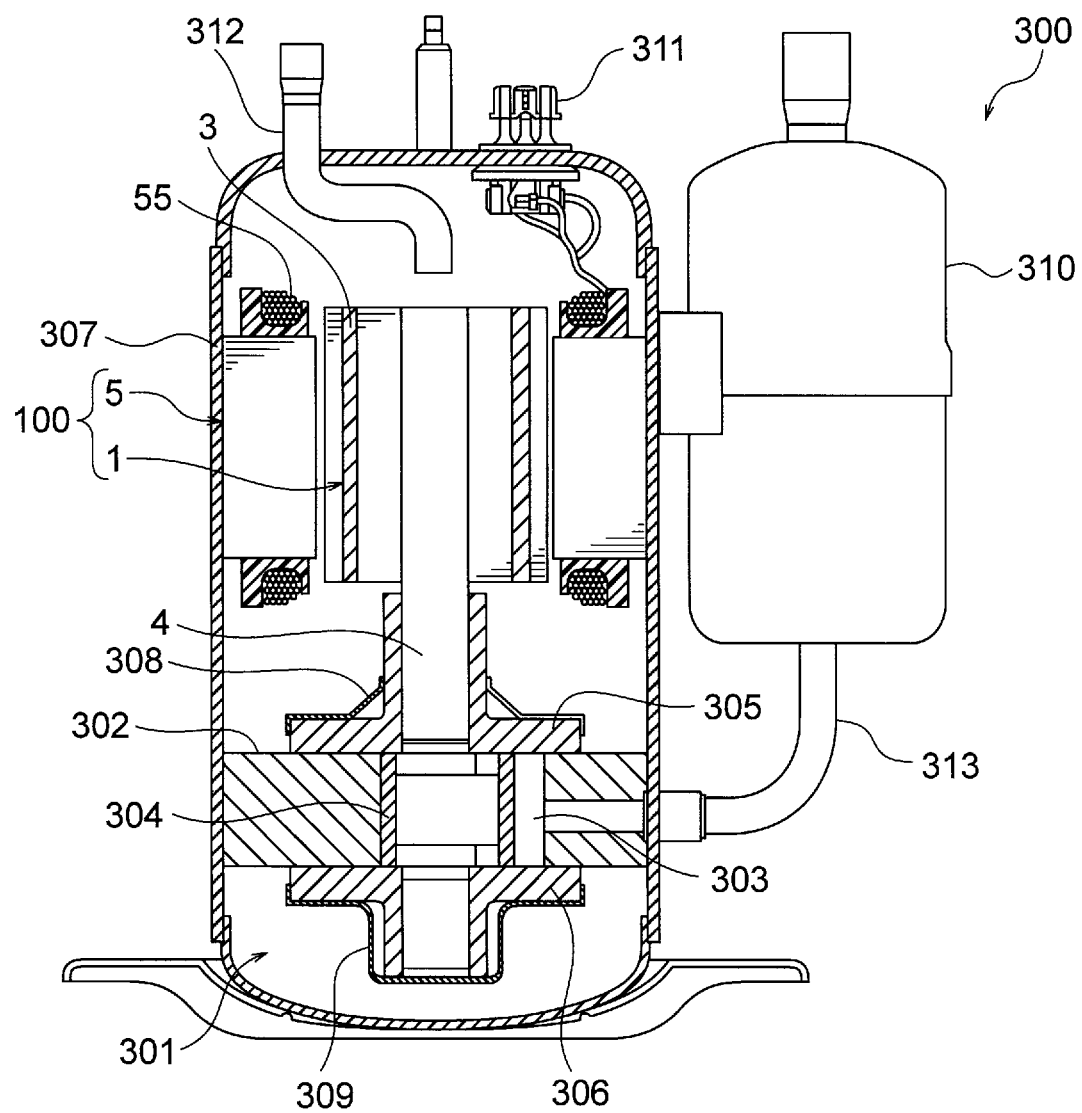
FIG. 17 is a longitudinal sectional view illustrating a rotary compressor to which the motor according to each Embodiment is applicable.

Next, a rotary compressor 300 to which the motor 100 according to each of the above-described Embodiments 1 to 5 is applicable will be described. FIG. 17 is a longitudinal sectional view illustrating a configuration of the rotary compressor 300. The rotary compressor 300 is used in, for example, an air conditioner, and includes a closed container 307, a compression mechanism 301 disposed in the closed container 307, and the motor 100 to drive the compression mechanism 301.

The compression mechanism 301 includes a cylinder 302 having a cylinder chamber 303, the shaft 4 of the motor 100, a rolling piston 304 fixed to the shaft 4, a vane (not illustrated) dividing an interior of the cylinder chamber 303 into a suction side and a compression side, and an upper frame 305 and a lower frame 306 closing end faces of the cylinder chamber 303 in the axial direction. The shaft 4 is inserted into the upper frame 305 and the lower frame 306. An upper discharge muffler 308 and a lower discharge muffler 309 are mounted on the upper frame 305 and the lower frame 306, respectively.

The closed container 307 is a cylindrical container. Refrigerating machine oil (not illustrated) for lubricating sliding portions of the compression mechanism 301 is stored at the bottom of the closed container 307. The shaft 4 is rotatably held by the upper frame 305 and the lower frame 306 serving as bearing portions.

The cylinder 302 has the cylinder chamber 303, and the rolling piston 304 eccentrically rotates in the cylinder chamber 303. The shaft 4 includes an eccentric shaft portion, and the rolling piston 304 is fitted to the eccentric shaft portion.

The stator 5 of the motor 100 is mounted inside a frame of the closed container 307 by a method such as shrink fitting, press fitting, or welding. Power is supplied to the coil 55 of the stator 5 via a glass terminal 311 fixed to the closed container 307. The shaft 4 is fixed to the center hole 15 formed at the center of the rotor core 10 (FIG. 2) of the rotor 1.

An accumulator 310 for storing refrigerant gas is attached to the outside of the closed container 307. A suction pipe 313 is fixed to the closed container 307, and the refrigerant gas is supplied from the accumulator 310 to the cylinder 302 via the suction pipe 313. A discharge pipe 312 for discharging the refrigerant outside is provided on the upper portion of the closed container 307.

The refrigerant gas supplied from the accumulator 310 is delivered to the cylinder chamber 303 of the cylinder 302 through the suction pipe 313. When the motor 100 is driven by current supplied by an inverter and the rotor 1 rotates, the shaft 4 rotates together with the rotor 1. The rolling piston 304 fitted to the shaft 4 eccentrically rotates in the cylinder chamber 303, and the refrigerant in the cylinder chamber 303 is compressed. The refrigerant compressed in the cylinder chamber 303 passes through the discharge mufflers 308 and 309, further passes through the through holes 16 (FIG. 2) of the rotor core 10 and the like, and ascends in the closed container 307. The refrigerant ascended in the closed container 307 is discharged through the discharge pipe 312 and supplied to a high-pressure side of a refrigeration cycle.

The motor 100 according to each of the above-described Embodiments 1 to 5 achieves high motor efficiency by suppressing demagnetization of the permanent magnets 3 during heating, and achieves high operation reliability by improving the fitting strength between the rotor core 10 and the shaft 4. Therefore, by applying the motor 100 to the rotary compressor 300, the operation efficiency of the rotary compressor 300 can be improved, and the reliability of the rotary compressor 300 can be improved.

The motor 100 according to each of Embodiments 1 to 5 can be used not only for the rotary compressor 300 but also for other types of compressors.

(Air Conditioner)

Figure 18:
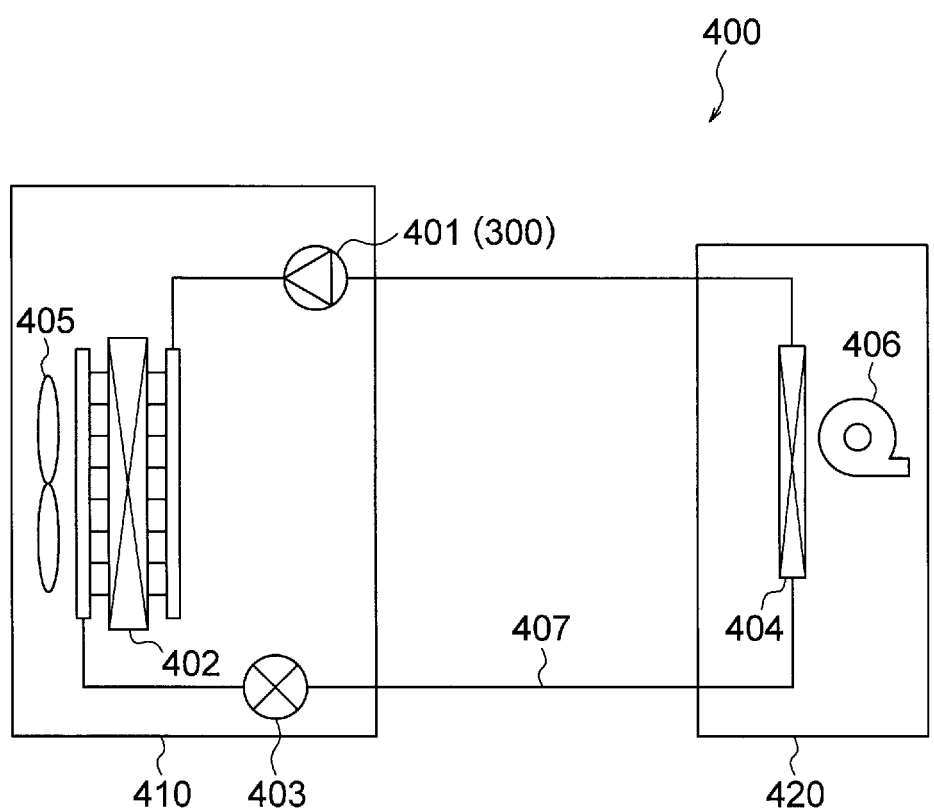
FIG. 18 is a diagram illustrating an air conditioner including the compressor illustrated in FIG. 17.

Next, an air conditioner 400 (refrigeration cycle apparatus) including the above described rotary compressor 300 will be described. FIG. 18 is a diagram illustrating a configuration of the air conditioner 400. The air conditioner 400 includes a compressor 401, a condenser 402, a throttle device (decompressor) 403, and an evaporator 404. The compressor 401, the condenser 402, the throttle device 403, and the evaporator 404 are connected to each other via a refrigerant pipe 407 to form the refrigeration cycle. In other words, refrigerant circulates through the compressor 401, the condenser 402, the throttle device 403, and the evaporator 404 in this order.

The compressor 401, the condenser 402, and the throttle device 403 are provided in an outdoor unit 410. The compressor 401 is constituted by the rotary compressor 300 illustrated in FIG. 17. A fan 405 for supplying outdoor air to the condenser 402 is provided in the outdoor unit 410. The evaporator 404 is provided in an indoor unit 420. A fan 406 for supplying indoor air to the evaporator 404 is provided in the indoor unit 420.

The operation of the air conditioner 400 is as follows. The compressor 401 compresses sucked refrigerant, and sends out the compressed refrigerant. The condenser 402 exchanges heat between the refrigerant flowing in from the compressor 401 and outdoor air to condense and liquefy the refrigerant, and sends out the liquefied refrigerant to the refrigerant pipe 407. The fan 405 supplies outdoor air to the condenser 402. The throttle device 403 changes its opening degree to control the pressure and the like of the refrigerant flowing through the refrigerant pipe 407.

The evaporator 404 exchanges heat between the refrigerant brought into a low pressure state by the throttle device 403 and indoor air to cause the refrigerant to take heat from the air and evaporate (vaporize), and then sends out the evaporated refrigerant to the refrigerant pipe 407. The fan 406 supplies indoor air to the evaporator 404. Thus, cooled air deprived of heat in the evaporator 404 is supplied into the room.

The compressor 300 of the air conditioner 400 can employ the motor 100 according to each of the above-described Embodiments 1 to 5, and therefore has high operation efficiency and high operation reliability. Hence, the energy efficiency of the air conditioner 400 can be improved, and the operation reliability of the air conditioner 400 can be improved.

While desirable embodiments of the present invention have been described in detail above, the present invention is not limited thereto, and various improvements or modifications may be made without departing from the gist of the present invention.

What is claimed is:

1. A rotor comprising:
    a rotor core having magnet insertion holes in a number corresponding to a pole number in a circumferential direction about an axis, and a center hole at a center portion of the rotor core in a radial direction about the axis; and
    a shaft inserted in the center hole,
    the rotor core having a plurality of first slits and a plurality of ribs alternately arranged in the circumferential direction along a periphery of the center hole, and a plurality of second slits on an outer side with respect to the plurality of first slits in the radial direction,
    wherein the plurality of first slits are equal in number to half or an integer multiple of the pole number, and the plurality of second slits are equal in number to half or an integer multiple of the pole number;
    wherein each of the plurality of second slits is formed to cover a corresponding rib of the plurality of ribs from an outer side in the radial direction;
    wherein each of the plurality of first slits has a length A1 in the circumferential direction and a width A2 in the radial direction;
    wherein each of the plurality of second slits has a length B1 in the circumferential direction and a width B2 in the radial direction; and
    A1>A2, B1>B2, and A1>B1 are satisfied.

2. The rotor according to claim 1, wherein each of the plurality of ribs has a width C in the circumferential direction, and
    wherein the width C is equal to or greater than a thickness of each of electromagnetic steel sheets forming the rotor core.

3. The rotor according to claim 2, wherein the width C is equal to or less than twice the thickness of the electromagnetic steel sheet.

4. The rotor according to claim 1, wherein each of the plurality of first slits is at a distance D in the radial direction from a corresponding second slit of the plurality of second slits, and
    wherein the distance D is equal to or greater than a thickness of each of electromagnetic steel sheets forming the rotor core.

5. The rotor according to claim 4, wherein the distance D is equal to or greater than four times the thickness of each of electromagnetic steel sheets forming the rotor core.

6. The rotor according to claim 1,
    wherein each of the plurality of ribs has a width C in the circumferential direction;
    wherein each of the plurality of first slits has a width A2 in the radial direction; and
    (B1−C)/2>A2 is satisfied.

7. The rotor according to claim 1, wherein each of the plurality of first slits is at a distance F in the radial direction from the center hole;
    wherein each of the plurality of ribs has a width C in the circumferential direction; and
    wherein the distance F is greater than the width C.

8. The rotor according to claim 1, wherein each of the plurality of first slits is at a distance F in the radial direction from the center hole;
    wherein each of the plurality of first slits is at a distance D in the radial direction from a corresponding second slit of the plurality of second slits; and
    wherein the distance F is greater than the distance D.

9. The rotor according to claim 1, wherein each of the plurality of ribs has a width C in the circumferential direction;
    wherein each of the plurality of first slits is at a distance D in the radial direction from a corresponding second slit of the plurality of second slits; and
    wherein the width C is less than the distance D.

10. The rotor according to claim 1, wherein the width A2 is wider than the width B2.

11. The rotor according to claim 1, wherein each of the plurality of first slits has the width A2 in the radial direction, and is at a distance F in the radial direction from the center hole, and
    wherein the distance F is less than the width A2.

12. The rotor according to claim 1, wherein when N represents the number of the plurality of first slits, each of the plurality of second slits is displaced by 360/(2×N) degrees in the circumferential direction with respect to a corresponding first slit of the plurality of first slits.

13. The rotor according to claim 1, wherein each of the plurality of ribs is formed at a position corresponding to a center in the circumferential direction of a corresponding magnet insertion hole of the plurality of magnet insertion holes.

14. The rotor according to claim 1, wherein the rotor core has a through hole or a crimping portion in a region between two second slits adjacent to each other in the circumferential direction of the plurality of second slits.

15. The rotor according to claim 1, wherein the rotor core has a through hole or a crimping portion on an outer side in the radial direction of a region between two second slits adjacent to each other in the circumferential direction of the plurality of second slits.

16. The rotor according to claim 1, wherein the rotor core has a third slit on an outer side of the plurality of second slits in the radial direction.

17. A motor comprising:
    the rotor according to claim 1; and
    a stator provided on an outer side of the rotor in the radial direction and surrounding the rotor.

18. A compressor comprising:
    the motor according to claim 17; and
    a compression mechanism driven by the motor.

19. An air conditioner comprising a compressor, a condenser, a decompressor, and an evaporator,
    the compressor comprising:
    the motor according to claim 17; and
    a compression mechanism driven by the motor.

20. A manufacturing method of the rotor according to claim 1, the method comprising the steps of:
    forming the rotor core;
    inserting a plurality of permanent magnets into the plurality of magnet insertion holes of the rotor core; and inserting the shaft into the center hole of the rotor core in a state where the rotor core is heated.

* * * * *